(12) United States Patent
Matsuzaki et al.

(10) Patent No.: US 11,828,502 B2
(45) Date of Patent: Nov. 28, 2023

(54) REFRIGERATOR

(71) Applicant: Samsung Electronics Co., Ltd, Suwon-si (KR)

(72) Inventors: Takashi Matsuzaki, Kanagawa (JP); Tatsuya Seo, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 16/327,752

(22) PCT Filed: Aug. 23, 2017

(86) PCT No.: PCT/KR2017/009205
§ 371 (c)(1),
(2) Date: Feb. 22, 2019

(87) PCT Pub. No.: WO2018/038528
PCT Pub. Date: Mar. 1, 2018

(65) Prior Publication Data
US 2019/0226733 A1   Jul. 25, 2019

(30) Foreign Application Priority Data

Aug. 24, 2016   (JP) .................................. 2016-164198
Sep. 21, 2016   (JP) .................................. 2016-184799
(Continued)

(51) Int. Cl.
*F25B 41/22*     (2021.01)
*F16K 31/04*     (2006.01)
(Continued)

(52) U.S. Cl.
CPC .............. *F25B 41/22* (2021.01); *F16K 3/314* (2013.01); *F16K 31/04* (2013.01); *F16K 31/043* (2013.01);
(Continued)

(58) Field of Classification Search
CPC ........ F16K 3/314; F16K 31/04; F16K 31/043; F25B 2309/006; F25B 2341/062;
(Continued)

(56) References Cited

U.S. PATENT DOCUMENTS 6,491,063 B1    12/2002   Benatav
7,770,406 B2 *   8/2010   Yoshioka .................. F25B 1/10
                                                              62/199

(Continued)

FOREIGN PATENT DOCUMENTS

JP       2005-214508 A      8/2005
JP       2014047850 A       3/2014
(Continued)

OTHER PUBLICATIONS

Supplementary European Search Report dated Jul. 2, 2019 in connection with European Patent Application No. 17 84 3948, 10 pages.

(Continued)

*Primary Examiner* — Elizabeth J Martin
*Assistant Examiner* — Dario Antonio Deleon

(57) ABSTRACT

A valve structure that may control the flow rate of a fluid when the fluid starts to be released is provided. In a valve structure including a valve sheet having two outlets to release a fluid and a valve body arranged to be rotational against the valve sheet to regulate a degree of opening of the outlet, the valve body has a fluid control recess formed in the circumferential direction whose area overlapping the outlet is changed by rotation of the valve body, and the center of the outlet is forced to deviate from a rotation trajectory of a front end portion of the fluid control recess that starts to overlap the outlet by the rotation of the valve body.

9 Claims, 30 Drawing Sheets

(30) Foreign Application Priority Data

Jan. 12, 2017 (JP) .................................. 2017-003115
Jul. 19, 2017 (JP) .................................. 2017-140384

(51) Int. Cl.

| | | |
|---|---|---|
| *F16K 3/314* | (2006.01) | |
| *F25B 41/37* | (2021.01) | |
| *F25B 41/35* | (2021.01) | |
| *F25B 9/06* | (2006.01) | |
| *F25B 5/02* | (2006.01) | |
| *F25D 11/02* | (2006.01) | |
| *F25B 5/00* | (2006.01) | |
| *F25B 13/00* | (2006.01) | |
| *F25B 9/00* | (2006.01) | |
| *F25B 1/10* | (2006.01) | |

(52) U.S. Cl.

CPC .................. *F25B 5/02* (2013.01); *F25B 9/06* (2013.01); *F25B 41/35* (2021.01); *F25B 41/37* (2021.01); *F25D 11/022* (2013.01); *F25B 1/10* (2013.01); *F25B 5/00* (2013.01); *F25B 9/008* (2013.01); *F25B 13/00* (2013.01); *F25B 2341/062* (2013.01); *F25B 2400/052* (2013.01); *F25B 2400/054* (2013.01); *F25B 2500/01* (2013.01)

(58) Field of Classification Search

CPC .......... F25B 2400/052; F25B 2400/054; F25B 2500/01; F25B 2600/2511; F25B 41/22; F25B 41/31; F25B 41/35; F25B 41/37; F25B 5/00; F25B 5/02; F25B 9/06; F25B 1/10; F25B 9/008; F25B 13/00; F25D 11/022; Y02B 30/70

USPC ........................... 62/199, 200, 504; 251/208
See application file for complete search history.

(56) References Cited

U.S. PATENT DOCUMENTS

| | | | |
|---|---|---|---|
| 10,203,139 B2 * | 2/2019 | Kobayashi | F25B 41/20 |
| 2015/0047376 A1 * | 2/2015 | Kwon | F25D 29/00 |
| | | | 62/115 |
| 2016/0305696 A1 | 10/2016 | Kobayashi et al. | |

FOREIGN PATENT DOCUMENTS

| | | | |
|---|---|---|---|
| JP | 2015-010815 A | | 1/2015 |
| JP | 2015-014294 A | | 1/2015 |
| JP | 2015014294 A | * | 1/2015 |
| JP | 2015-129625 A | | 7/2015 |
| KR | 10-2004-0084784 A | | 10/2004 |
| KR | 10-2013-0071124 A | | 6/2013 |
| KR | 10-2015-0063930 A | | 6/2015 |

OTHER PUBLICATIONS

International Search Report dated Dec. 20, 2017 in connection with International Patent Application No. PCT/KR2017/009205, 2 pages.
Written Opinion of the International Searching Authority dated Dec. 20, 2017 in connection with International Patent Application No. PCT/KR2017/009205, 10 pages.
Notice of Patent Allowance dated May 20, 2022 in connection with Korean Patent Application No. 10-2018-7032973, 3 Pages.
Korean Intellectual Property Office, "Notice of Preliminary Rejection" dated Nov. 22, 2021, in connection with Korean Patent Application No. 10-2018-7032973, 5 pages.
Communication under Rule 71(3) EPC dated Jun. 12, 2023, in connection with European Application No. 17843948.5, 86 pages.

* cited by examiner

REFRIGERATOR

CROSS-REFERENCE TO RELATED APPLICATIONS

This application is a 371 of International Application No. PCT/KR2017/009205 filed on Aug. 23, 2017, which claims priority to Japanese Patent Application No. 2016-164198 filed on Aug. 24, 2016, Japanese Patent Application No. 2016-184799 filed on Sep. 21, 2016, Japanese Patent Application No. 2017-003115 filed on Jan. 12, 2017, and Japanese Patent Application No. 2017-140384 filed on Jul. 19, 2017, the disclosures of which are herein incorporated by reference in their entirety.

BACKGROUND

1. Field

The present disclosure relates to a valve structure used in a refrigerator-freezer and a refrigerator using the valve structure.

2. Description of Related Art

As a valve structure used for refrigerators, there is a conventional one as disclosed in Japanese Patent Publication No. 2005-214508 having a valve sheet with two outlets through which to discharge a refrigerant formed thereon and a valve body rotationally arranged against the valve sheet to open or close each of the outlets, and configured to selectively send the refrigerant to an evaporator for the fridge or an evaporator for the freezer according to opening of one or the other of the outlets as the valve body is rotated.

The valve body has a regulation recess formed in the circumferential direction, whose area overlapping the outlet changes as the valve body is rotated, to control the flow rate of the refrigerant to be sent to each evaporator. In this structure, the valve body is rotated from a state in which the outlet is closed, so the overlapping area between the outlet and the regulation recess becomes large, which may increase the flow rate of the refrigerant.

However, since the aforementioned valve structure is configured to be rotated such that the front end portion of the regulation recess, which starts to overlap the outlet, passes by the center of the outlet, the front end portion of the regulation recess starts to overlap from the front with the outlet when the refrigerant starts to be released.

As a result, when the refrigerant starts to be released, the overlapping area between the outlet and the front end portion of the regulation recess is large, making the refrigerant flow to the outlet in a burst, thereby making it difficult to control the flow rate of the refrigerant with high precision.

SUMMARY

The present disclosure is to solve the aforementioned problem, and has an object in providing a valve structure to control the flow rate of a fluid with high precision when the fluid starts to be released.

A valve structure of the disclosure includes a valve sheet having two outlets through which to release a fluid, and a valve body arranged to be movable against the valve sheet to regulate a degree of opening of the outlet, wherein the valve body has a regulation recess to control a flow rate of a fluid released from the outlet, and the center of the outlet deviates from a movement trajectory of a front end portion of the regulation recess, which starts to overlap the outlet, as the valve body is moved.

The movement trajectory of the front end portion as herein used is a concept including a movement trajectory of the front end portion of the regulation recess or a movement trajectory of a portion located behind the front end portion.

In this valve structure, the center of the outlet deviates from the movement trajectory of the front end portion of the regulation recess, so that the front end portion of the regulation recess overlaps the outlet at an angle with the front when the regulation recess and the outlet start to overlap each other.

This may reduce an overlapping area between the front end portion of the regulation recess and the outlet as compared with the conventional occasion when a refrigerant starts to be released, making it possible to gradually increase the flow rate of the refrigerant, and thus to control with high precision the flow rate of a fluid when the fluid starts to be released.

In a specific embodiment, the valve body may be formed to be rotational against the valve sheet, and the regulation recess may be formed along a circumferential direction to have a changing area that overlaps the outlet as the valve body is rotated.

However, when the center of the outlet deviates significantly from a rotation trajectory of the front end portion of the regulation recess, making the overlapping area between the front end portion and the outlet become very small, a foreign material may not be released from the outlet when the foreign material flows into the front end portion.

Therefore, it is desirable to displace the center of the outlet from the rotation trajectory of the front end portion of the regulation recess, so that in the case a foreign material flows into the front end portion of the regulation recess, the front end portion overlaps the outlet for the foreign material to be released from the outlet along with the fluid.

This structure may enable the foreign material to be released along with the fluid even when the foreign material flows into the front end portion of the regulation recess.

To ensure that the foreign material is released out, the width of an overlapping portion between the front end portion of the regulation recess and the outlet may be set based on the size of the foreign material.

As for a specific shape of the regulation recess, the regulation recess may have a shape with the width that grows from the front end portion to the opposite side, a rear end portion.

In the meantime, it is often the case that the regulation recess and the outlet may deviate from their designed locations (hereinafter, referred to as reference locations) to the outside or inside in the radial direction due to manufacturing or assembling variations.

In a case that the outlet deviates inward in the radial direction from the reference location, a degree of opening of the valve is large and a rotation angle at which the refrigerant starts to be released is reached early as compared with an occasion when the outlet is at the reference location. This leads to a concern for a sudden increase in flow rate when the refrigerant starts to be released. The same problem also arises when the regulation recess deviates outward in the radial direction from the reference location.

Accordingly, given that the location of the outlet deviates inward in the radial direction or the location of the regulation recess deviates outward in the radial direction, it is desirable for the regulation recess to have a narrow portion with a constant width from the front end portion to the rear end portion and an expanding portion with the width growing from the narrow portion toward the rear end portion.

This structure may help reduce a sudden increase in flow rate when the refrigerant starts to be released even when the overlapping area between the regulation recess and the outlet reaches an upper limit (a maximum) due to the aforementioned displacement of location, thereby making it possible to control the flow rate in a minimum flow rate region with the minimum influence of the manufacturing or assembling variations of the regulation recess or outlet.

In order to prevent the sudden increase in flow rate when the refrigerant starts to be released even if the overlapping area between the regulation recess and the outlet reaches the upper limit (the maximum), it is desirable to have the narrow width formed to be almost parallel to the rotation trajectory of the front end portion.

It is desirable to have the outer side of the expanding portion get away from the rotation trajectory of the front end portion toward the outside.

This form of the outer side of the expanding portion may help the flow rate gradually increase after the refrigerant starts to be released to some extent, thereby preventing a sudden increase in the flow rate when the entire regulation recess continues to pass by the outlet and the outlet becomes fully opened.

In order to gradually increase the flow rate by preventing the sudden increase in the flow rate after the refrigerant starts to be released to some extent, to reduce variations in proportion of an area of the flow path that occur in the narrow portion, it is desirable that the inner side of the expanding portion may come close to or be parallel to the rotation trajectory of the front end portion.

In a specific embodiment, the inner and outer sides of the expanding portion may be asymmetrical to the rotation trajectory of the front end portion.

In the meantime, in a case that the outlet deviates outward in the radial direction, a degree of opening of the valve is small and a rotation angle at which the refrigerant starts to be released is reached late as compared with an occasion when the outlet is at the reference location. This makes the overlapping area between the front end portion of the regulation recess and the outlet 3a become so small that the flow rate hardly increases even with rotation of the valve body when the refrigerant starts to be released. As a result, in the case that the outlet deviates outward in the radial direction, the refrigerant does not flow at the same rotation angle as in the case that the outlet is at the reference location, which might cause a failure of cooling or if no failure of cooling, a damage to a basic performance, such as an increase in power consumption. The same problem also arises when the regulation recess deviates inward in the radial direction from the reference location.

Accordingly, given that the location of the outlet deviates outward in the radial direction or the location of the regulation recess deviates inward in the radial direction, it is desirable that the outlet is arranged such that the rotation trajectory of the front end portion of the regulation recess overlaps the outlet at a point closer to a rotation axis of the valve body rather than at the center of the outlet.

The structure may secure an overlapping area between the regulation recess and the outlet even if the overlapping area has a lower limit (a minimum), even though the outlet deviates outward in the radial direction. This may prevent the trouble of cooling failure or damage to a basic performance, such as an increase in power consumption because the overlapping area between the front end portion of the regulation recess and the outlet does not become very small when the refrigerant starts to be released.

Subsequently, a valve structure of the disclosure, which employs a three-way valve, i.e., a case of releasing a fluid brought in through an inlet provided in the valve structure through two outlets formed at the valve sheet, will now be described. For the three-way valve, what is disclosed in the Japanese Patent Publication is known.

In a case that the valve structure of the disclosure employing the three-way valve is used in e.g., a refrigerator-freezer having a fridge and a freezer, the valve structure may be configured to form a fully open region where the two outlets are fully opened at the same time according to a rotation angle of the valve body.

In this structure, the fully open region where the two outlets are fully opened may increase cooling speed in the fridge and the freezer under an overload condition e.g., at the time of pull-down.

The valve structure may be configured to form a variable flow rate region in which one of the two outlets overlaps the regulation recess while the other is fully closed and a fully closed region in which the two outlets are fully closed at the same time, according to the rotation angle of the valve body.

In this structure, the variable flow rate region may help regulate the refrigerant at a suitable flow rate according to a load while cooling each of the fridge and freezer. Furthermore, when the compressor is stopped, the fully closed region may help prevent a high-temperature refrigerant from flowing into the evaporator from the condenser, thereby preventing a rise in temperature in each chamber due to the inflow of the refrigerant while the compressor is stopped.

When the valve structure that may form the fully open region, the variable flow rate region, and the fully closed region is manufactured, the manufacturing conditions are limited to set a rotation range of the valve body to less than 360 degrees by e.g., a stopper for correction of a starting point or location recognition as well as make the valve structure compact and simple, and thus it is very difficult to form each of the aforementioned regions. To deal with the dilemma of forming the fully open region, the variable flow rate region, and the fully closed region with a compact and simple valve structure, the inventor has reviewed the problems over and over again.

And finally he has discovered that when the valve body is formed to have a first fully open recess continually formed from the rear end portion of the regulation recess and overlapping the entire outlet, and a second fully open recess overlapping the entire outlet separately from the first fully open recess, and the regulation recess is formed within 60 degrees around the rotation axis of the valve body, it is possible to form the fully open region, the variable flow rate region, and the fully closed region using a compact and simple valve structure such as a three-way valve.

Next, an occasion when a four-way valve is used for the valve structure will now be described. A four-way valve, as disclosed in e.g., Japanese Patent Publication No. 2004-293573, is known to have a second valve sheet with a third outlet formed thereon and a second valve body arranged to be rotational against the second valve sheet, in addition to the aforementioned valve sheet and valve body.

The four-way valve may be considered as being used in e.g., a refrigerator-freezer having a flex zone in addition to a fridge and a freezer.

In this case, a valve structure of the disclosure includes a second valve sheet with a third outlet formed thereon to release a fluid, a second valve body arranged to be rotational against the second valve sheet and rotated while engaging the valve body to regulate a degree of opening of the outlet, and a regulation recess formed along the circumferential direction and having an area overlapping the third outlet change by rotation of the second valve body.

The valve structure may be configured to form a fully open region in which one of the two outlets formed at the valve sheet and the third outlet formed at the second valve body are fully opened according to a rotation angle of the first valve body and the second valve body.

In this structure, as with the three-way valve, the fully open region makes the two outlets fully opened to increase the cooling speed in the fridge, freezer, or flex zone under an overload condition e.g., at the time of pull-down.

The valve structure may be configured to form a variable flow rate region in which one of the three outlets overlaps the regulation recess while the other two are fully closed and a fully closed region in which the three outlets are fully closed at the same time, according to the rotation angles of the valve body and the second valve body.

In this structure, as with the aforementioned three-way valve, the variable flow rate region may help regulate the refrigerant at a suitable flow rate according to a load condition when each of the fridge, freezer, and flex zone is cooled. Furthermore, the fully closed region may help prevent a high-temperature refrigerant from flowing into the evaporator from the condenser, thereby preventing a rise in temperature in each chamber due to the inflow of the refrigerant when the compressor is stopped.

As already described above, it is very hard to make the valve structure that may form the fully open region, the variable flow rate region, and the fully closed region compact and simple.

After the inventor reviewed the problems over and over again, he has finally discovered that when each of the valve body and the second valve body has a fully open recess continually formed from the rear end portion of the regulation recess and overlapping the entire outlet, and each regulation recess is formed within 60 degrees around the rotation axis of the valve body or the rotation axis of the second valve body, it is possible to form the fully open region, the variable flow rate region, and the fully closed region using a compact and simple valve structure such as a four-way valve.

Subsequently, a refrigerator equipped with a switching valve such as the aforementioned three-way valve and four-way valve will now be described.

It is common for the conventional refrigerator to arrange the switching valve in a machine room and use a capillary tube as a decompression tool that couples the switching valve to an evaporator.

A refrigerator as disclosed in this document expands a flow rate regulation range with the switching valve switching between a plurality of capillary tubes with different tube diameters in that there is no flow rate regulation in decompression by the capillary tube.

It is also common for the conventional refrigerator to perform heat-exchange by contacting a returning pipe from the capillary tube to evaporator to the compressor via e.g., soldering. Performing heat-exchange in the capillary tube and returning pipe may gain an effect of increasing the cooling capacity by preventing a liquid from returning by heating the returning pipe and cooling the capillary tube.

In the conventional refrigerator, in a case of applying a means to expand the range of flow rate regulations in a cooling cycle having a plurality of evaporators by using the plurality of capillary tubes, the number of switchings increases and thus multiple switching valves may be required, which leads to a concern for rising costs, and in a case of connecting the capillary tube and the returning pipe, the number of capillary tubes that may be connected to a single returning pipe is limited in terms of manufacturing, so there may be a capillary tube that may not be connected to the returning pipe, thereby making it impossible to obtain the aforementioned effect of preventing a liquid from returning and increasing the cooling capacity.

Accordingly, the present disclosure has an object in gaining an effect of preventing a liquid from returning and increasing the cooling capacity by taking a wide range of flow rate regulations for each of the plurality of evaporators in the cooling cycle that switches between the plurality of evaporators.

That is, the refrigerator in the disclosure is characterized by having a capillary tube between a three-way valve or four-way valve and an evaporator.

With this structure, the three-way valve or four-way valve having the aforementioned flow rate regulation region is used in the refrigerator, thereby taking a wide range of flow rate regulations in the cooling cycle that switches between the plurality of evaporators.

In the meantime, if the flow rate regulation of the refrigerant is made only with the three-way valve or four-way valve in the machine room, the refrigerant temperature at the exit of the three-way valve or four-way valve is almost the same as evaporation temperature, so there is a concern for dew condensation in a portion in the machine room of the pipe from the machine room to the refrigerator.

In this regard, with the aforementioned structure, first decompression is made in the three-way valve or four-way valve and second decompression is made in the capillary tube, keeping the temperature at the exit of the three-way valve or four-way valve higher than the evaporation temperature, thereby suppressing dew condensation in a portion of the pipe on the side of the machine room as well as gaining an effect of preventing returning of a liquid by heat exchange between the capillary tube and the returning pipe and increasing cooling capacity.

According to the disclosure as described above, it is possible to control flow rate with high precision when a fluid such as a refrigerant starts to be released by gradually increasing the fluid when the fluid starts to be released.

Furthermore, in a case of using a three-way valve or four-way valve, with a compact and simple configuration, a fully open region, a variable flow rate region, or a fully closed region may be formed, and when applied in refrigerator-freezer for example, improvement in cooling rate, suitable regulation of refrigerant flow rate, prevention of a rise in temperature in each chamber when the compressor is stopped, prevention of dew condensation in a pipe in the machine room, prevention of returning of a liquid by heat exchange between the capillary tube and the returning pipe, improvement in cooling capacity, etc., may be facilitated.

DETAILED DESCRIPTION

First Embodiment

A first embodiment of the disclosure will be first described with reference to drawings.

A valve structure in accordance with the first embodiment is used as a so-called four-way valve.

Figure 1A:
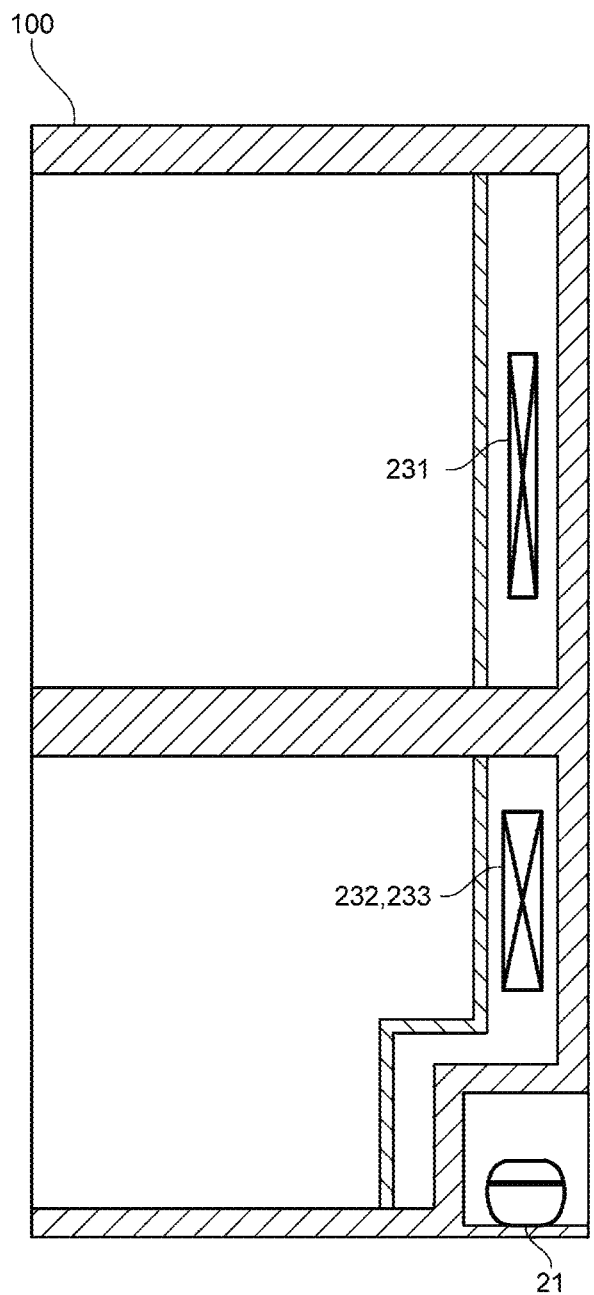
FIG. 1A is a schematic diagram of an inside of a refrigerator-freezer, according to a first embodiment.
Figure 1B:
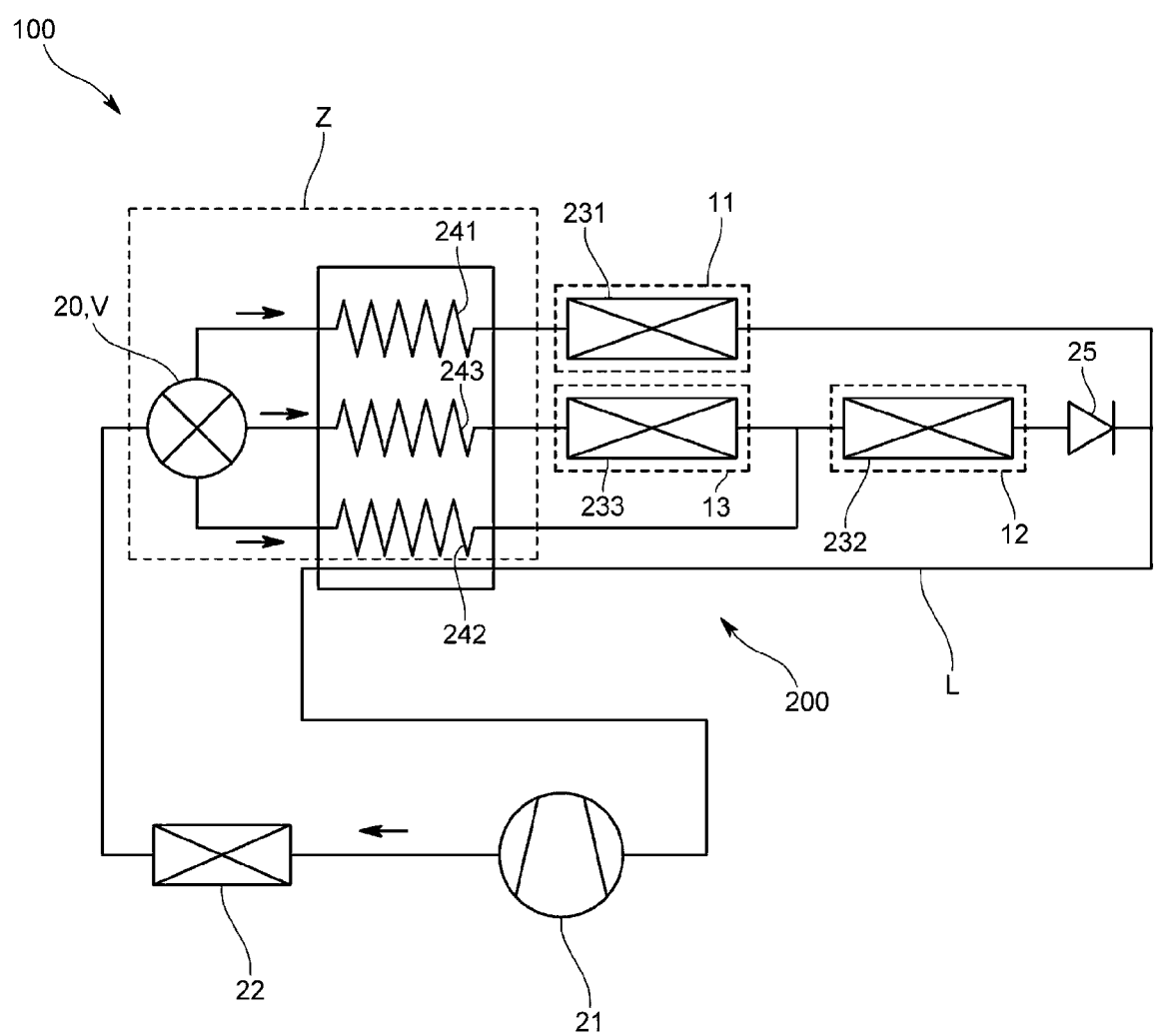
FIG. 1B is an arrangement plan of a refrigerant circuit of the refrigerator-freezer, according to the first embodiment.

A valve structure 20 in the embodiment is used for e.g., a refrigerator-freezer 100, as shown in FIG. 1. The valve structure 20 is not, however, limited to the refrigerator-freezer, but may be used in a fluid circuit for supplying a fluid to a plurality of spots.

The refrigerator-freezer 100 will be described first.

Figure 2:
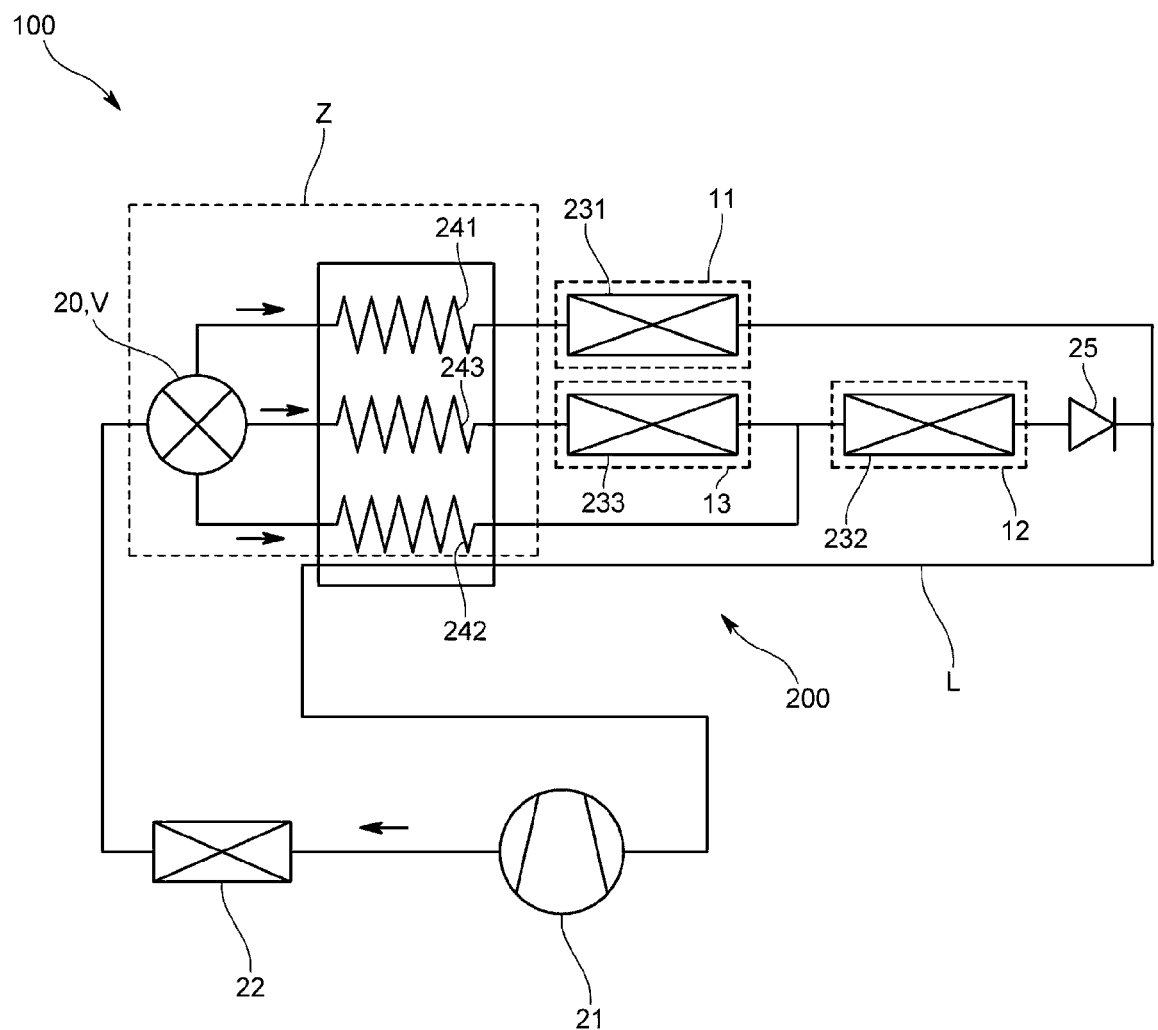
FIG. 2 is a schematic diagram illustrating the refrigerant circuit of the refrigerator-freezer, according to the first embodiment.

The refrigerator-freezer 100 includes a fridge 11, a freezer 12, and a flex zone 13, as shown in FIGS. 1A to 2, and further includes a refrigerant circuit 200 having a compressor 21, a condenser 22 arranged to the side of an exit of the compressor 21, a plurality of evaporators 231 to 233 each provided in each chamber between an exit of the condenser 22 and an entrance of the compressor 21 (to distinguish them, hereinafter called an evaporator for fridge 231, an evaporator for freezer 232, and an evaporator for flex zone 233), and a plurality of decompressors 241 to 243 (to distinguish them, hereinafter called a decompressor for fridge 241, a decompressor for freezer 242, and a decompressor for flex zone 243) each arranged to the side of an entrance of each of the evaporators 231 to 233.

Specifically, the evaporator for flex zone 233 is arranged to the side of an entrance of the evaporator for freezer 232, and a check valve 25 is arranged to the side of an exit of the evaporator for freezer 232. The evaporator for flex zone 233 may be arranged to the side of the exit of the evaporator for freezer 232 or may be arranged in parallel with the evaporator for freezer 232.

A capillary tube for fridge 241 as the decompressor for fridge is arranged in series at a side of the entrance of the evaporator for fridge 231, a capillary tube for freezer 242 as the decompressor for freezer is arranged in series at a side of the entrance of the evaporator for freezer 232, and a capillary tube for flex zone 243 as the decompressor for flex zone is arranged in series at a side of the entrance of the evaporator for flex zone 233.

Given that the capillary tubes 241 to 243 are arranged in parallel with each other and the evaporator for flex zone 233 is arranged at the side of the entrance of the evaporator for freezer 232, a joint between the evaporator for flex zone 233 and the evaporator for freezer 232 and the exit of the decompressor for freezer 242 are connected by a pipe, allowing the refrigerant released from the decompressor for freezer 242 to flow not into the evaporator for flex zone 233 but into the evaporator for freezer 232.

The refrigerant circuit 200 in accordance with the embodiment is configured such that a returning pipe L connecting the exit of each of the evaporators 231, 232, and 233 to the entrance of the compressor is thermally linked to the aforementioned capillary tubes and heat-exchange is made between a low temperature refrigerant flowing in the returning pipe L and a high temperature refrigerant flowing in the capillary tubes 241, 242, and 243. Specifically, the returning pipe L and the capillary tubes 241, 242, and 243 are connected by e.g., soldering.

The capillary tubes 241, 242, and 243 constitute a decompression tool Z that changes a high pressure refrigerant released from the condenser 22 to a low pressure refrigerator, together with an expansion valve V having the valve structure 20, which will be described below.

The valve structure 20 will now be described.

The valve structure 20 is intended to release a refrigerant into one or more of the plurality of evaporators 231 to 233, and as shown in FIGS. 1A to 2, has the form to connect the exit of the condenser 22 to the entrances of the capillary tubes 241 to 243 in a machine room.

In the embodiment, the valve structure 20 is a so-called four-way valve to release a refrigerant brought in to one or two of the three evaporators 231 to 233, and is configured to be able to regulate the flow rate of the refrigerant to be released to each of the evaporators 231 to 233.

Figure 3:
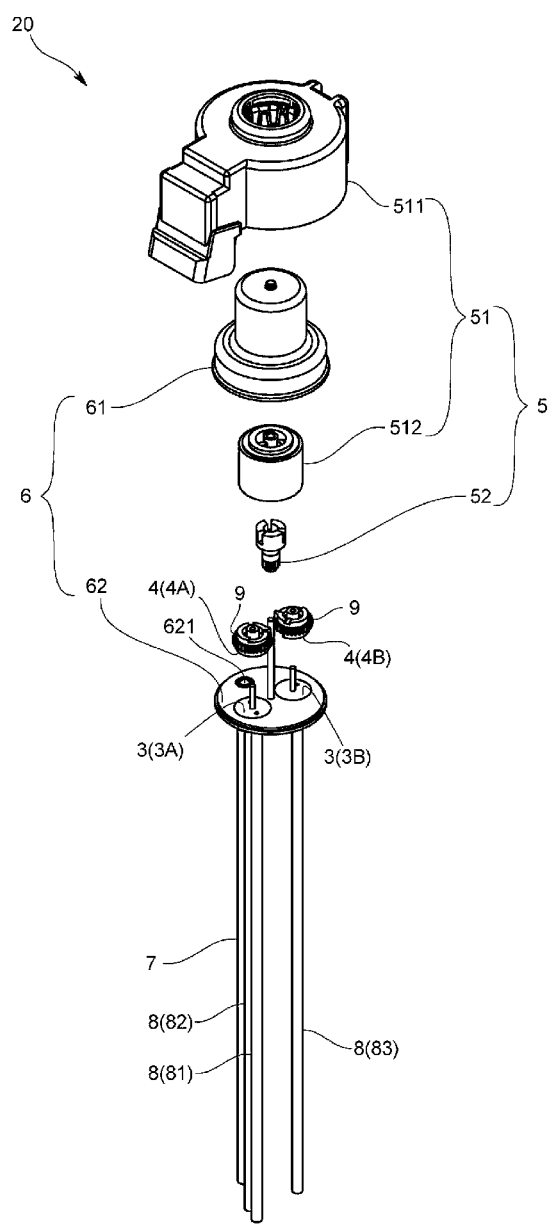
FIG. 3 is a schematic diagram of a whole valve structure viewed from above, according to the first embodiment.
Figure 4:
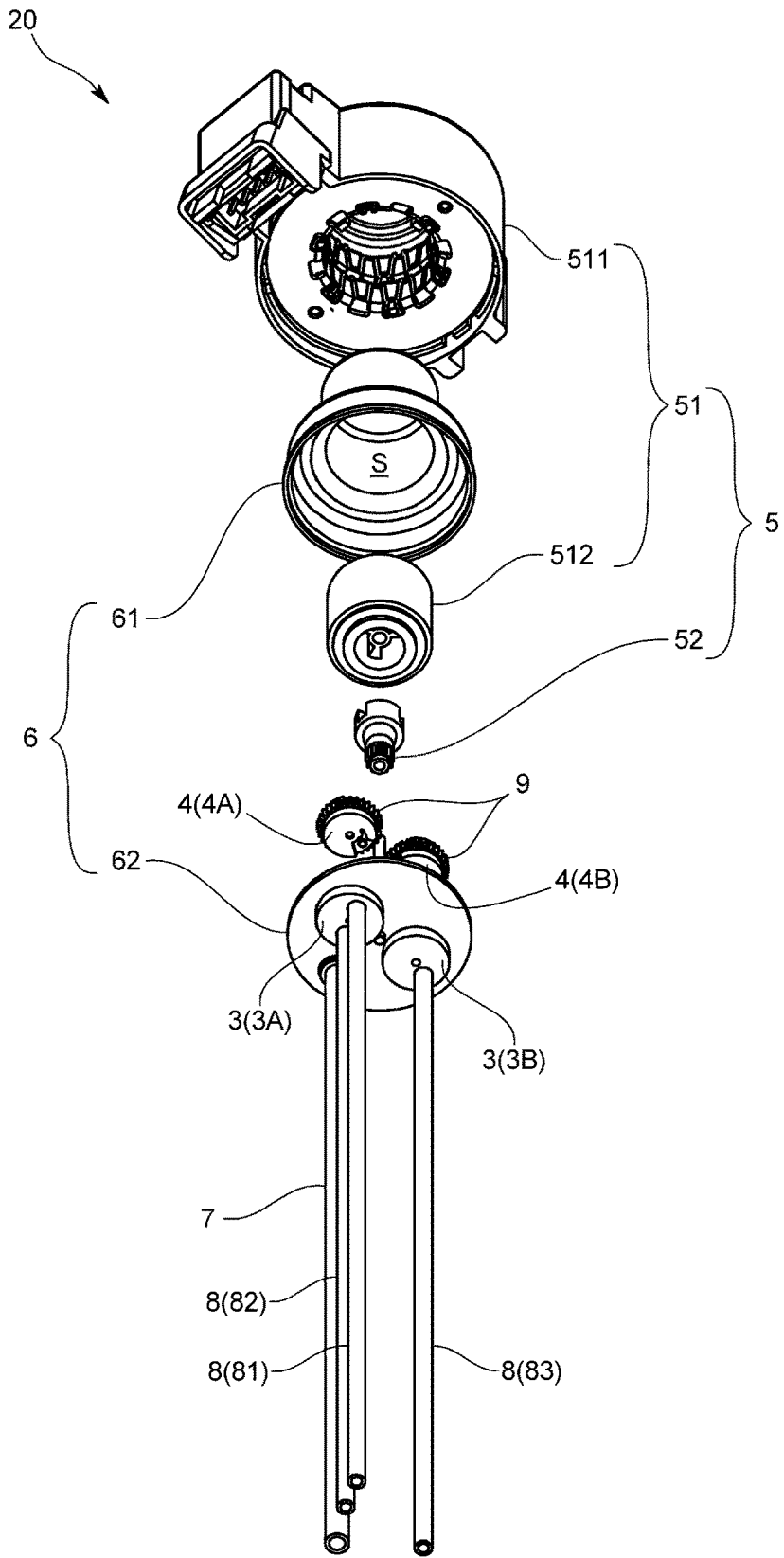
FIG. 4 is a schematic diagram of the whole valve structure viewed from below, according to the first embodiment.
Figure 5:
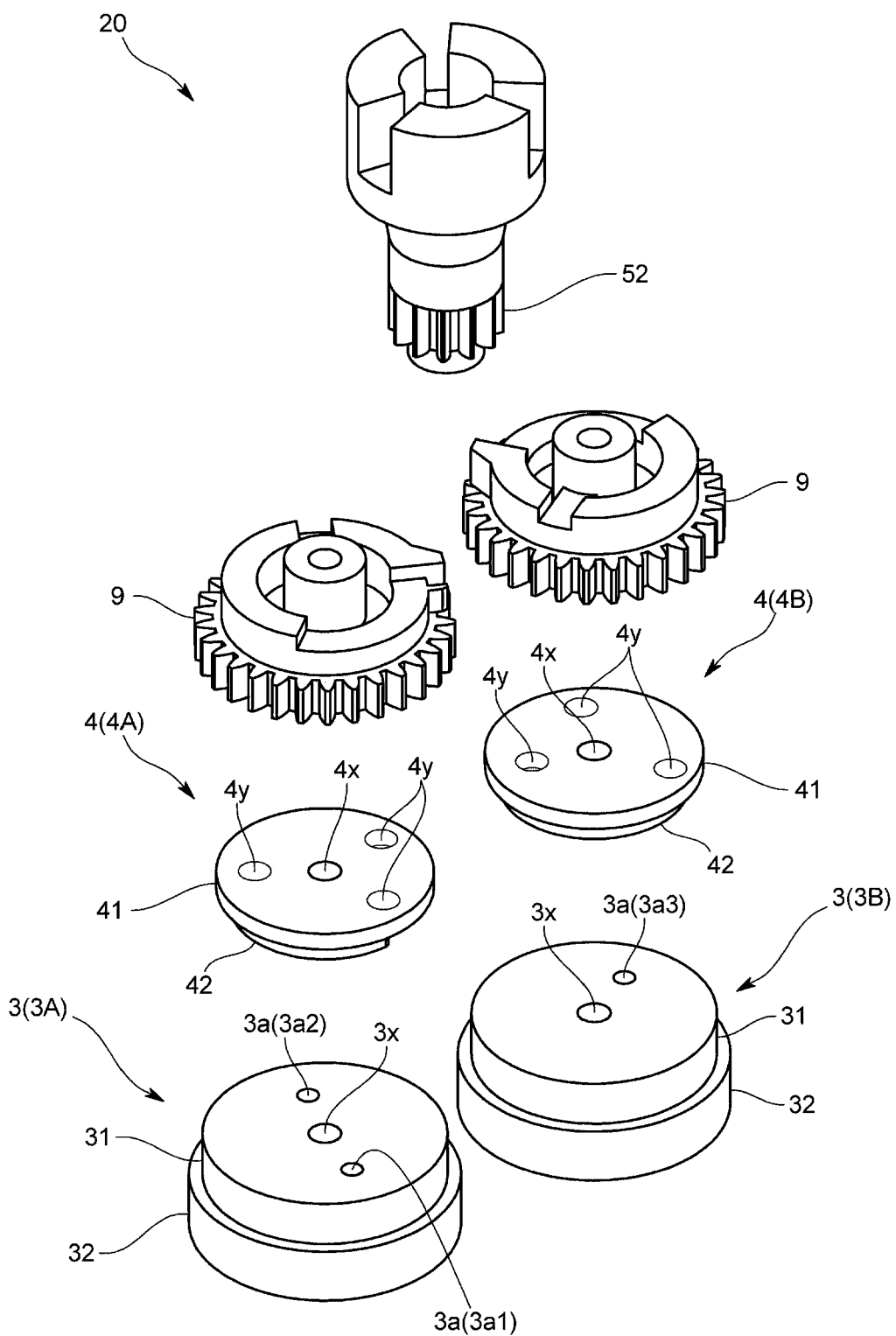
FIG. 5 is a schematic diagram of a valve sheet and a valve body viewed from above, according to the first embodiment.
Figure 6:
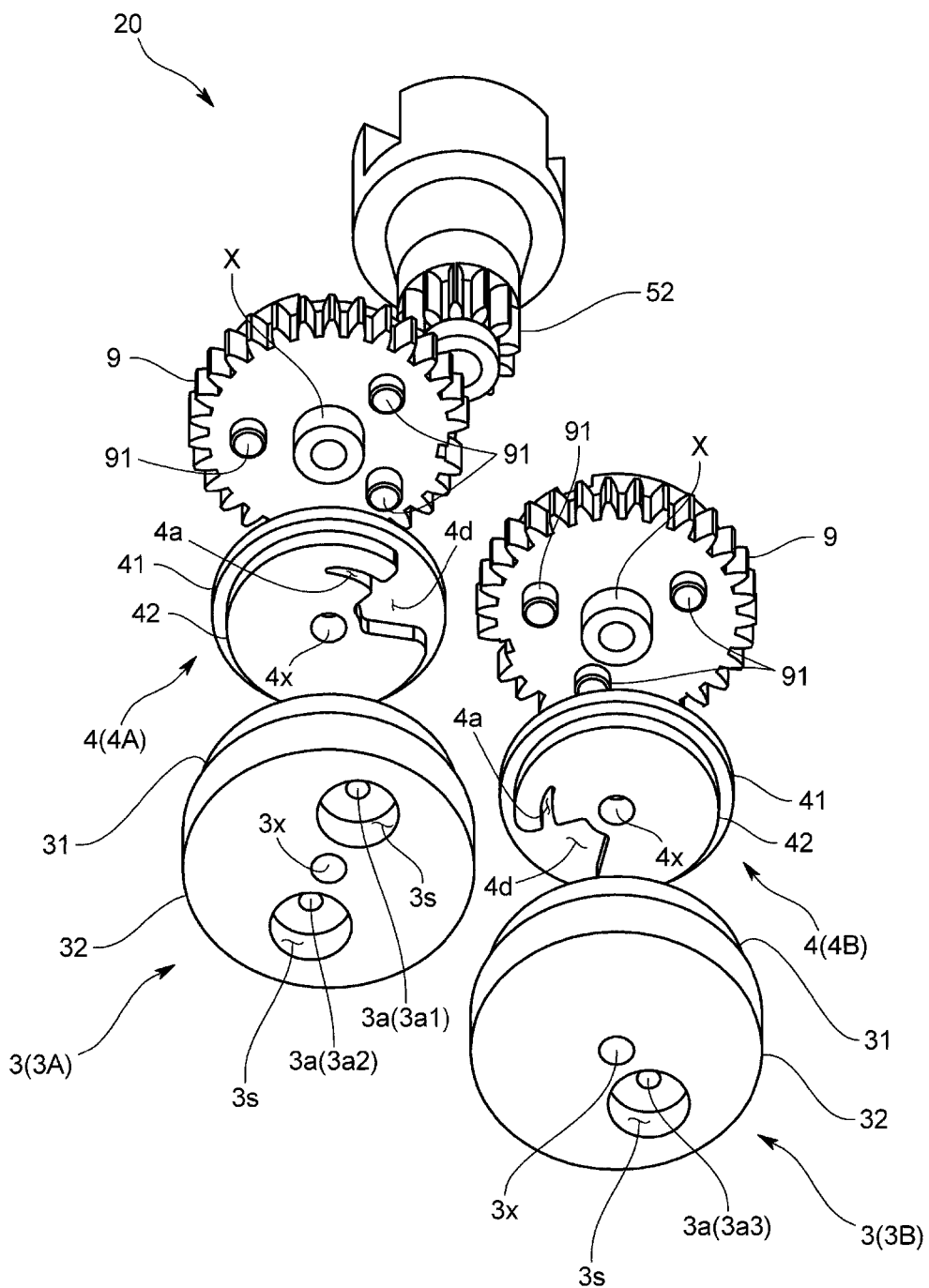
FIG. 6 is a schematic diagram of the valve sheet and the valve body viewed from below, according to the first embodiment.

Specifically, the valve structure 20 includes at least a valve sheet 3 and a valve body 4, as shown in FIGS. 3 and 4, and further includes a driving tool 5 for rotating the valve body 4 and a casing 6 that accommodates the valve sheet 3 and the valve body 4 and has a refrigerant inflow space S into which the refrigerant flows.

The driving tool 5 includes a motor 51 having a stator 511 and a rotor 512 arranged inside the stator 511, and an output gear 52 for outputting driving force of the motor 51 by being rotated while engaging the rotor 512.

The casing 6, as shown in FIG. 4, includes a main casing body 61 with a cavity having an opening formed at the bottom, and a cover body 62 forming the refrigerant inflow space S with the main casing body 61 by closing the opening.

The main casing body 61 has the form of e.g., a rotating body formed of metal, and in this case, is arranged inside the stator 511 while accommodating the rotor 512 in the cavity.

The cover body 62 is shaped like a flat plate and has an inlet 621 which is linked to the refrigerant inflow space S and through which to draw the refrigerant into the refrigerant inflow space S. In this case, the cover body 62 has the shape of a disc having e.g., less than 35 mm of diameter. The inlet 621 is connected to the exit of the condenser 22 by an inlet pipe 7, so that the refrigerant released from the condenser 22 flows into the refrigerant inflow space S.

The valve sheet 3, as shown in FIGS. 3 to 6, is tightly inserted to a through hole formed at the cover body 62 without a gap, and has an outlet 3a which is linked to the refrigerant inflow space S and through which to discharge the refrigerant from the refrigerant inflow space S. Furthermore, at the center of the valve sheet 3, a through hole 3x, to which a rotation shaft X of the valve body 4 is inserted, as will be described later, is formed.

In the embodiment, to be easily installed at the cover body 62, the valve sheet 3 has an upper part 31 having the same size as the through hole formed at the cover body 62 and a lower part 32 having a size larger than the upper part 31. In this case, when the upper part 31 is inserted from below to the through hole of the cover body 62, an end part formed between the upper part 31 and the lower part 32 meets the bottom face of the cover body 62.

Specifically, the valve sheet 3 is shaped like a disc with the diameter of 16 mm or less, and the outlet 3a of e.g., the diameter of 0.8 mm is formed on the top face by penetrating the upper part 31 of the valve sheet 3 in the thickness direction.

Furthermore, at the lower part 32, a hole 3s for outlet pipe is formed to have a larger diameter than the outlet 3a for an outlet pipe 8 to be inserted to the hole for outlet pipe. The outlet 3a is connected to the entrance of the evaporator 231 to 233 by the outlet pipe 8, allowing the refrigerant released from the refrigerant inflow space S to flow to any one of the evaporators 231 to 233 through the outlet 3a.

In the embodiment, the valve structure 20 includes two valve sheets 3 (hereinafter, referred to as a first valve sheet 3A and a second valve sheet 3B), as shown in FIGS. 3 to 6. The first valve sheet 3A is installed at one of two through holes formed at the cover body 62 and the second valve sheet 3B is installed at the other through hole. Herein, the first and second valve sheets 3A and 3B are shaped like a disc of the same diameter.

At the first valve sheet 3A, there are two outlets 3a (hereinafter, referred to as a first outlet 3a1 and a second outlet 3a2) formed. In this embodiment, the first outlet 3a1 is connected to the entrance of the evaporator for fridge 231 by the first outlet pipe 81, and the second outlet 3a2 is connected to the entrance of the evaporator for freezer 232 by the second outlet pipe 82.

The first and second outlets 3a1 and 3a2 have the same size of diameter and are arranged in the circumferential direction around the center of the first valve sheet 3A. In other words, a distance from the center of the first valve sheet 3A to the center of the first outlet 3a1 and a distance from the center of the first valve sheet 3A to the center of the second outlet 3a2 are the same.

At the second valve sheet 3B, there is an outlet 3a (hereinafter, referred to as a third outlet 3a3) formed. In this embodiment, the third outlet 3a3 is connected to the entrance of the evaporator for flex zone 233 by a third outlet pipe 83.

Furthermore, the third outlet 3a3 has the same size of diameter as that of the first and second outlets 3a1 and 3a2. A distance from the center of the second valve sheet 3B to the center of the third outlet 3a3 is equal to the distance from the center of the first valve sheet 3A to the center of each of the first and second outlets 3a1 and 3a2.

The valve body 4 is provided to be rotational against the valve sheet 3, and intended to regulate the degree of opening of the outlet 3a between a fully open state and a fully closed state. The valve body 4 has a regulation recess 4a formed to have a changing area that overlaps the outlet 3a by rotation of the valve body 4.

Although the first and second valve bodies 4A and 4B are provided to correspond to the first and second valve sheets 3A and 3B, respectively, in this embodiment, the first valve body 4A (hereinafter, briefly called the valve body 4) will be described because the first and second valve bodies 4A and 4B have the same structure.

The valve body 4 is arranged above the valve sheet 3, as shown in FIGS. 3 to 6, and rotated around the center axis of the valve sheet 3, and has a through hole 4x through which the rotation shaft X passes. A passive gear 9 which engages with the aforementioned output gear 52 is mounted on the valve body 4, and the rotation shaft X is at the passive gear 9. More specifically, the passive gear 9 has a plurality of protrusions 91, and a plurality of concave parts 4y to be coupled with the protrusions 91 are formed on the top face of the valve body 4. This enables the rotation shaft X to be inserted to the through hole 4x and couples the protrusions 91 to the concave parts 4y, allowing the valve body 4 to engage and rotate with the passive gear 9 according to the driving force of the driving tool 5.

Furthermore, in this embodiment, as described above, the first and second valve bodies 4A and 4B are arranged to correspond to the first and second valve sheets 3A and 3B, respectively, and two passive gears 9 arranged on the first and second valve bodies 4A and 4B, respectively, engage the common output gear 52. This enables the first and second valve bodies 4A and 4B to be engaged and rotated.

The valve body 4 includes an upper part 41 shaped like a flat plate, and a lower part 42 shaped like a flat plate with the aforementioned regulation recess 4a formed by penetration in the thickness direction. The upper part 41 has the form of e.g., a disc that overlaps the entire lower part 42, and the lower part 42 is a disc having the regulation recess 4a formed therein. In this embodiment, for example, the valve body 4 is shaped like a disc having the diameter of 12 mm or less, and the regulation recess 4a is formed to extend in the circumferential direction.

Figure 7:
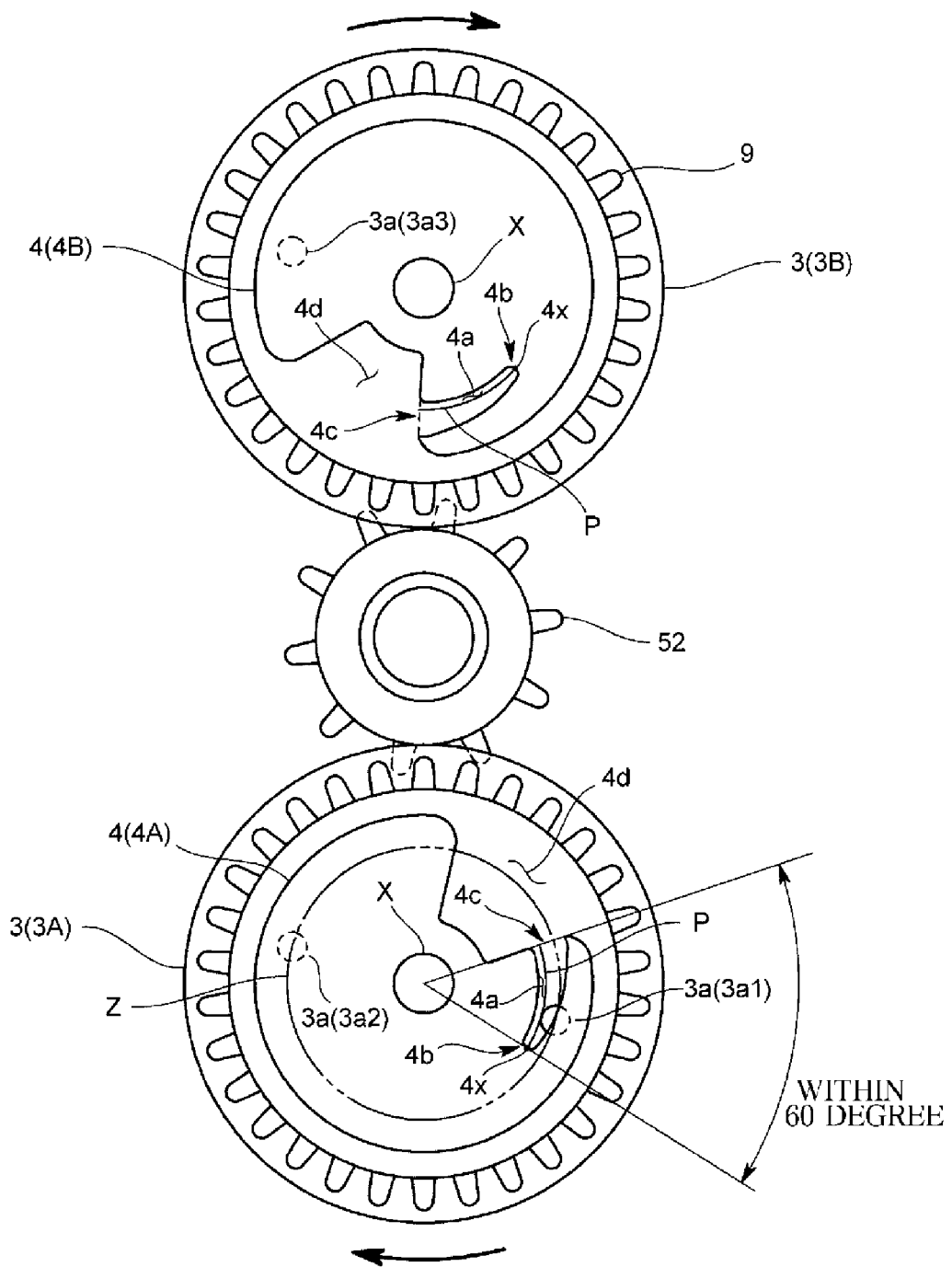
FIG. 7 is a plan view illustrating the valve sheet and the valve body, according to the first embodiment.

The regulation recess 4a is formed to have a changing width in the circumferential direction, as shown in FIG. 7, and in this case, the width gradually increases from a front end portion 4b starting to overlap with the outlet 3a according to rotation of the valve body 4 to a rear end portion 4c on the opposite side. The regulation recess 4a is formed to fall within 60 degrees around the rotation shaft X of the valve body 4 from the front end portion 4b to the rear end portion 4c.

Figure 8:
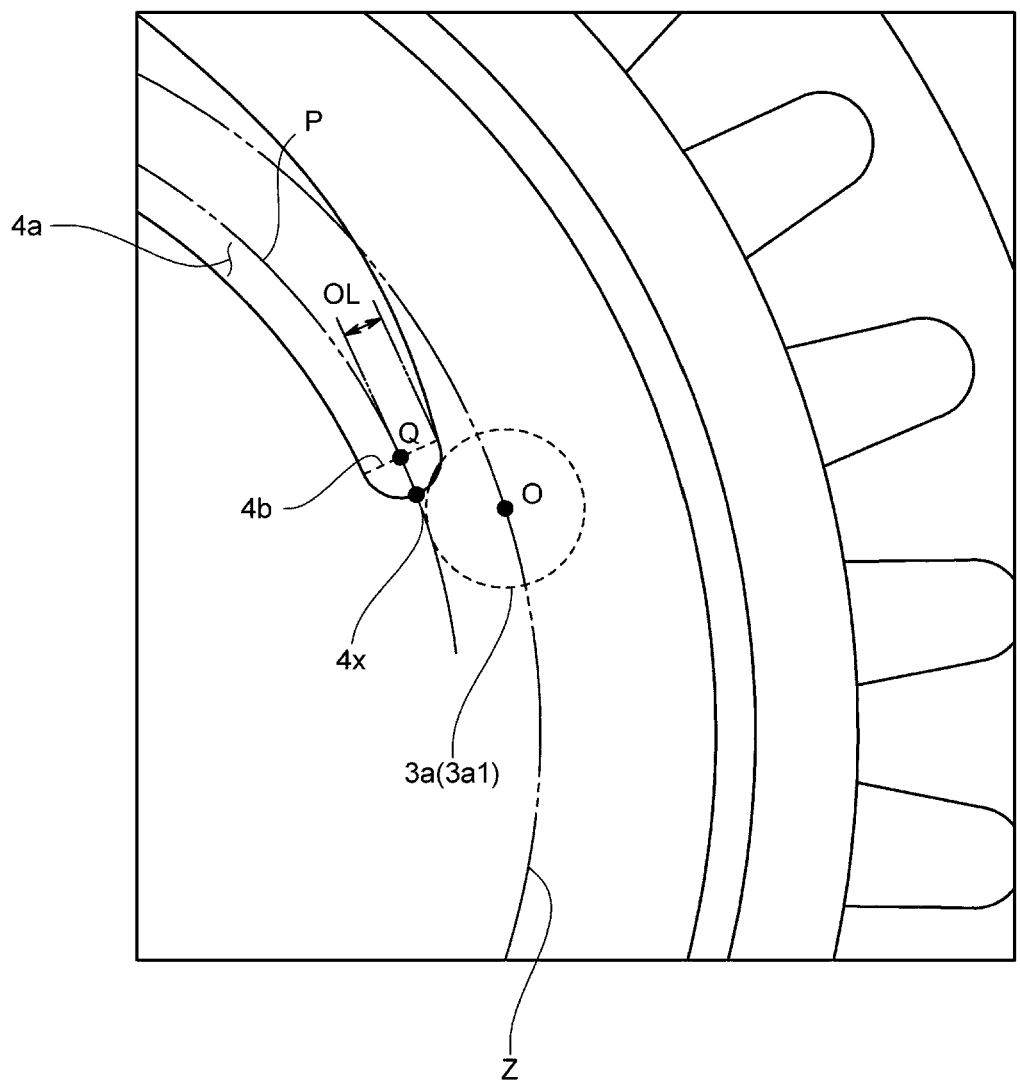
FIG. 8 is a schematic diagram for explaining a regulation recess, according to the first embodiment.

As shown in FIG. 8, the front end portion 4b is part of a circle (here, a half circle) centered at a point Q located on a rotation trajectory P of a fore-end 4x. The fore-end 4x of the regulation recess 4a is an end of the front end portion 4b in the rotational direction of the valve body 4.

Specifically, the front end portion 4b has a shape having the width of 0.2 mm or more, and in this embodiment, the front end portion 4b corresponds to a half portion of a circle having the diameter of 0.2 mm or more. Furthermore, the width as herein used refers to a size in a direction perpendicular to the rotation trajectory P of the fore-end 4x.

Moreover, as shown in FIG. 7, far behind the rear end portion 4c of the regulation recess 4a, there is a fully open recess 4d successively formed from the rear end portion 4c to overlap the entire outlet 3a. The fully open recess 4d is formed by notching the lower part 42 of the valve body 4 in the circumferential direction from the rear end portion 4c to the opposite side of the rotational direction of the valve body 4.

In this embodiment, as shown in FIGS. 7 and 8, the center O of the outlet 3a is forced to deviate from the rotation trajectory of the front end portion 4b of the regulation recess 4a.

More specifically, in this case, a rotation trajectory P of the fore-end 4x of the regulation recess 4a deviates inward from a virtual circle Z centered at the rotational shaft X of the valve body 4 and passing the center O of the outlet 3a.

In the meantime, the refrigerator-freezer 100 in accordance with the embodiment includes a filter (not shown) arranged in the upstream of the valve structure 20, but some foreign materials smaller than meshes of the filter are likely to pass the filter and flow into the refrigerant inflow space S.

For example, when the foreign materials come into the front end portion 4b of the regulation recess 4a in the valve body 4A shown in FIG. 7, they may not be raked out only by the rotation of the valve body 4 but might be accumulated in the front end portion 4b of the regulation recess 4a.

Hence, to ensure that the foreign materials flowing into the front end portion 4b is released from the outlet 3a along with the refrigerant, the size of the width of a portion overlapping with the outlet 3a in the front end portion 4b needs to be set. The size of the width is set based on the mesh size of the filter in order for the foreign materials passing the filter to be released from the outlet 3a. For example, the size of the width is set to 0.1 mm or more given the size of the foreign material introduced.

In this embodiment, the size of the width of the portion overlapping with the outlet 3a in the front end portion 4b is set to be larger than the foreign material by ensuring that at least the fore-end 4x of the regulation recess 4a overlaps the outlet 3a and the radius OL of the front end portion 4b is set to 0.1 mm or more.

Next, operation of the valve structure 20 and flows of the refrigerant will be described.

Figure 9:
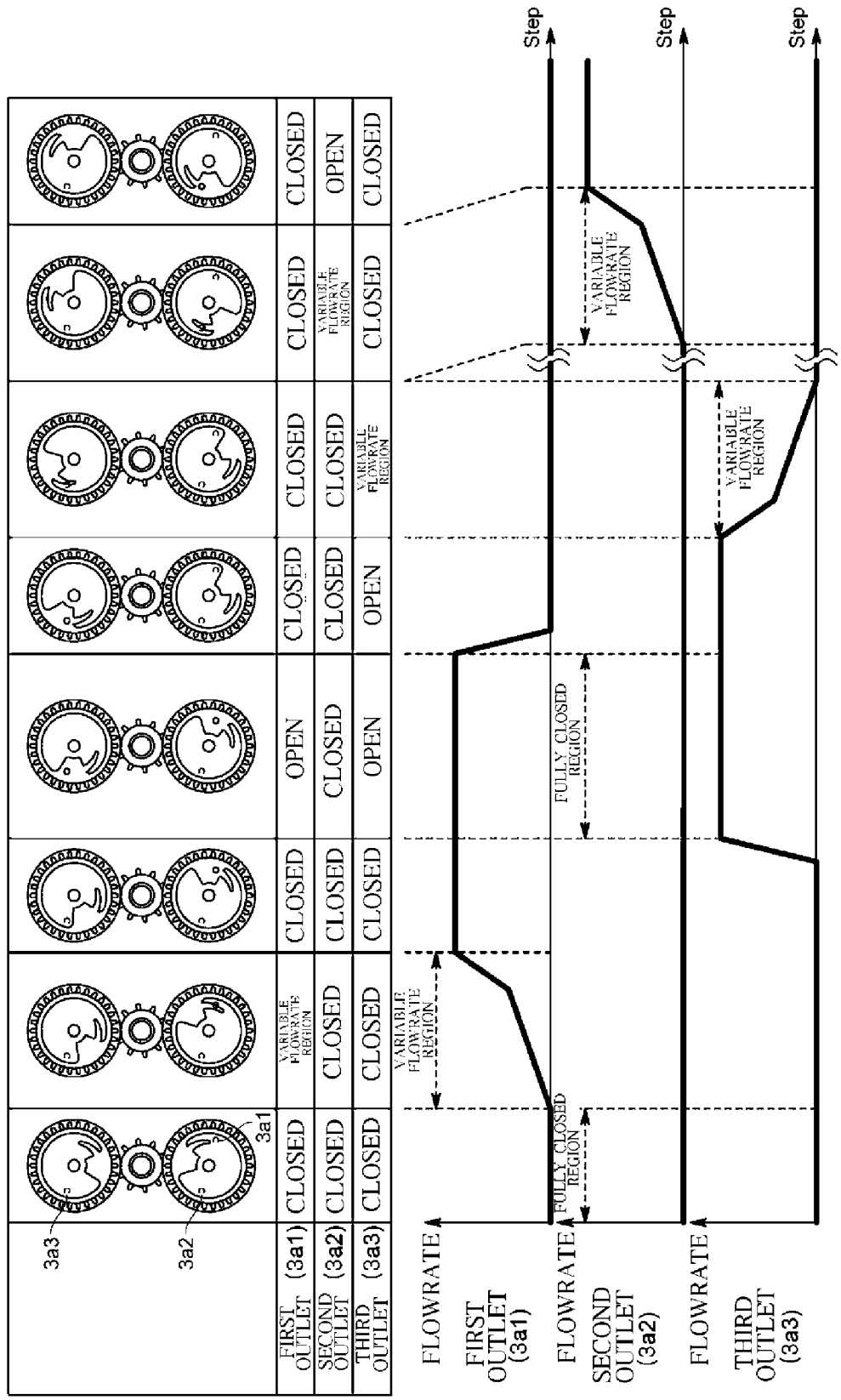
FIG. 9 is a diagram for explaining operation of the valve structure and flows of a refrigerant, according to the first embodiment.

In this embodiment, as shown in FIG. 9, the valve structure 20 is configured to form a fully closed region, a fully open region, and three variable flow rate regions according to rotation angles of the first and second valve bodies 4A and 4B as the first and second valve bodies 4A and 4B are engaged and rotated.

In the fully closed region, the first, second and third outlets 3a1, 3a2, and 3a3 are fully closed at the same time.

In the fully open region, any one of the first and second outlets 3a1 and 3a2 and third outlet 3a3 are fully opened at the same time. In this embodiment, in the fully open region, the first and third outlets 3a1 and 3a3 are fully open at the same time, and in other words, the fully open recess 4d of the first valve body 4A overlaps the entire first outlet 3a1 while the fully open recess 4d of the second valve body 4B overlaps the entire third outlet 3a3.

In the variable flow rate region, it is possible to regulate the flow rate of a refrigerant released from each of the outlets 3a1 to 3a3 separately, and in other words, the regulation recess 4a overlaps any one of the first, second, and third outlets 3a1, 3a2, and 3a3 while the other two are fully closed. The variable flow rate region is provided for each of the outlets 3a1 to 3a3.

Furthermore, in this embodiment, in the variable flow rate region, the flow rate of the refrigerant released from the first and second outlets 3a1 and 3a2 gradually increases while the flow rate of the refrigerant released from the third outlet 3a3 gradually decreases.

Apart from the fully closed region, fully open region, and variable flow rate region, there is a region formed, as shown in FIG. 9, in which any one of the first, second, and third outlets 3a1, 3a2, and 3a3 is fully opened while the other two are fully closed. In other words, in the region, the fully open recess 4d overlaps one of the first, second, and third outlets 3a1, 3a2, and 3a3 while the other two are closed.

Furthermore, there is a region between the variable flow rate regions formed for the third outlet 3a3 and the second outlet 3a2, as an available region in which all of the first, second, and third outlets 3a1, 3a2, and 3a3 are fully closed.

Figure 10:
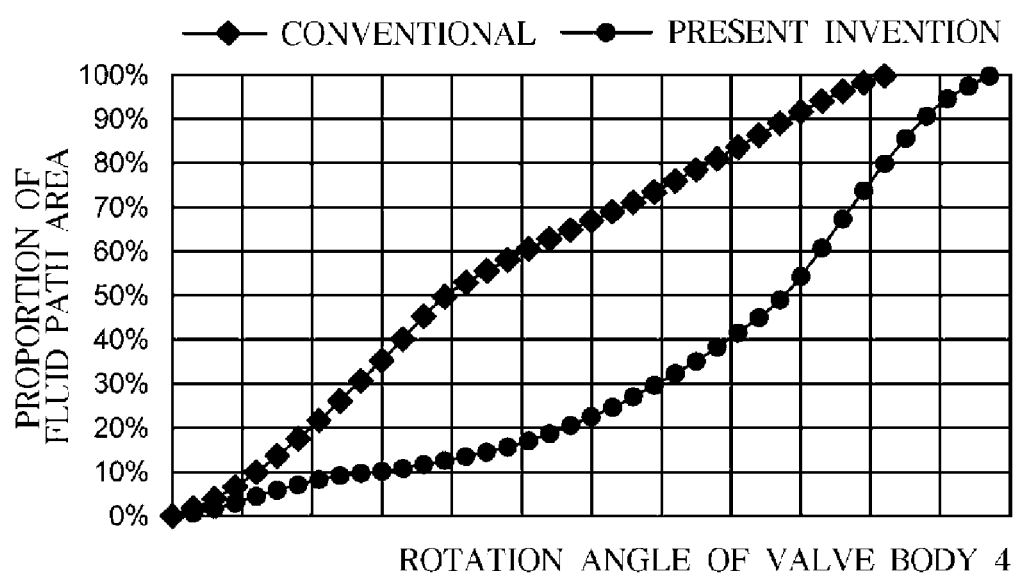
FIG. 10 shows experimental data of comparison between the valve structure of the first embodiment and a conventional valve structure.

In this embodiment, the refrigerator-freezer 100 configured as described above makes the center O of the outlet 3a deviate from the rotation trajectory P of the front end portion 4b of the regulation recess 4a, so the front end portion 4b of the regulation recess 4a starts to overlap the outlet 3a from a direction angled from the front as the valve body 4 is rotated. Hence, as seen from design data of FIG. 10, when the refrigerant starts to be released, it is ensured that an area overlapping between the front end portion 4b of the regulation recess 4a and the outlet 3a becomes smaller than in a conventional occasion. As a result, it is possible to control the flow rate with high precision when a fluid such as a refrigerant starts to be released by gradually increasing the flow rate of the refrigerant when the refrigerant starts to be released.

Moreover, while the fore-end 4x of the regulation recess 4a overlaps the outlet 3a as the valve body 4 is rotated, the overlapping area is larger than the foreign materials introduced, so that the foreign materials may be released from the outlet 3a along with the refrigerant even after they flow into the front end portion 4b of the regulation recess 4a.

Furthermore, with the fully closed region where the three outlets 3a1 to 3a3 are fully closed at the same time, inflow of a high-temperature refrigerant from the condenser 22 to each of the evaporators 231 to 233 may be prevented when the compressor 21 is stopped, thereby preventing a rise in temperature in each chamber 11 to 13 from the inflow of the refrigerant while the compressor 21 is stopped.

Also, with the fully open region where two of the outlets 3a1 and 3a3 are fully opened at the same time, the refrigerant may be supplied to the three chambers, the fridge 11, the freezer 12, and the flex zone 13 in the fully open state so that cooling speed for each chamber may be improved under an overload condition, e.g., at a time of pull-down.

In addition, with the variable flow rate region where the flow rate of each of the three outlets 3a1 to 3a3 is adjustable separately, the refrigerant for each of the chambers 11 to 13 may be regulated at a suitable flow rate while the chamber is cooled.

Figure 11:
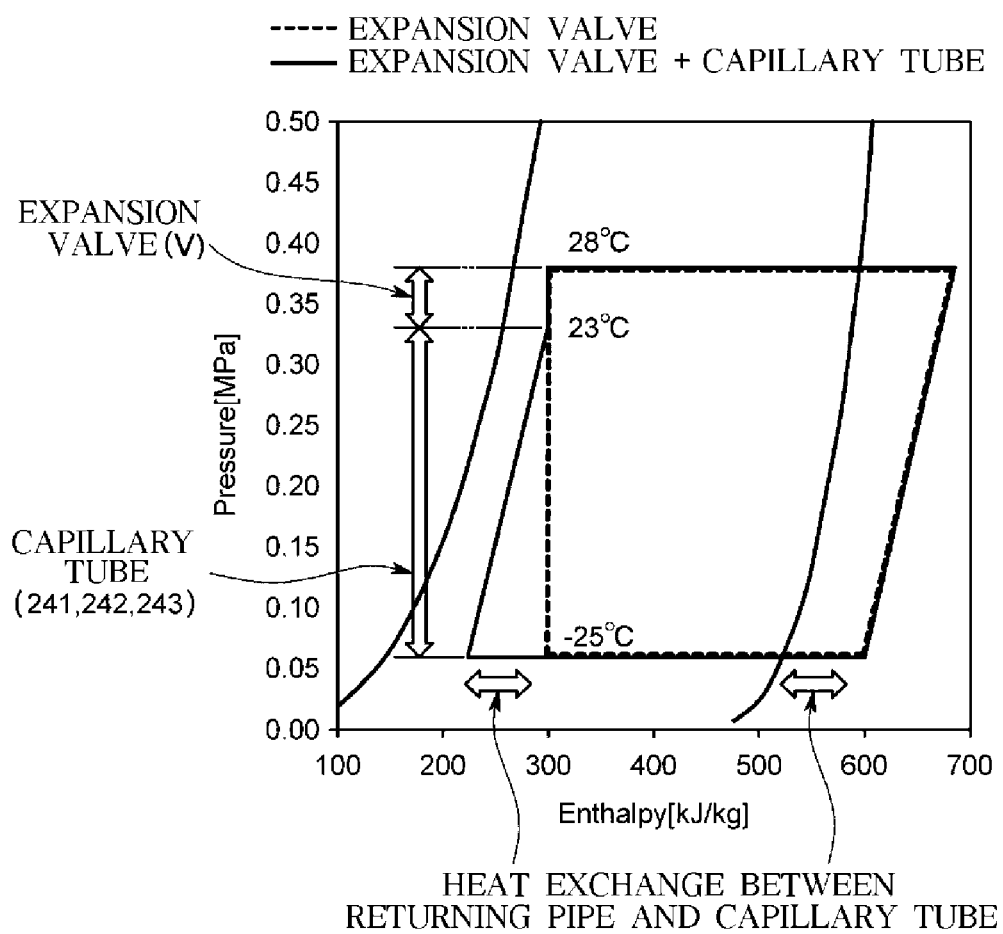
FIG. 11 is a Mollier diagram of a cooling cycle, according to the first embodiment.

FIG. 11 shows a Mollier diagram of a cooling circuit, according to the embodiment. In this embodiment, since the decompression tool Z has the expansion valve V and the capillary tubes 241, 242, and 243, the refrigerant released from the condenser 22 may be gradually decompressed using the expansion valve V and the capillary tubes 241, 242, and 243.

This may keep the refrigerant flowing from the expansion valve V to the capillary tubes 241, 242, and 243 at higher temperature than before the refrigerant flows into the evaporator 231 to 233, thereby preventing dew condensation in a portion in the machine room of the capillary tubes 241 to 243 from the outlet of the expansion valve V into the chamber, as shown in FIG. 11.

For example, since the refrigerant returning pipe L and the capillary tubes 241 to 243 make thermal connection by e.g., soldering, heat is exchanged between the refrigerant returning from the evaporator 231 to 233 to the compressor 21 and the refrigerant flowing from the expansion valve V to the capillary tube 241, 242, and 243 toward the evaporator.

This enables the liquid refrigerant that has not been evaporated in the evaporator 231, 232, and 233 to be evaporated by being heated in the refrigerant returning pipe L before returning to the compressor 21, thereby preventing the liquid refrigerant from returning to the compressor 21.

Furthermore, as shown in FIG. 11, the refrigerant in the capillary tubes 241, 242, and 243 are cooled while being decompressed, facilitating improvement of cooling cycle efficiency.

Second Embodiment

Next, a second embodiment of the disclosure will be described with reference to drawings.

The valve structure 20 in accordance with the second embodiment is used as a so-called three-way valve. In the second embodiment, in the valve structure 20, the expansion valve V is included as in the first embodiment, and the expansion valve V and the capillary tubes 241 and 242 constitute the decompression tool Z for changing the high-pressure refrigerant from the condenser 22 to a low-pressure refrigerant.

Figure 12A:
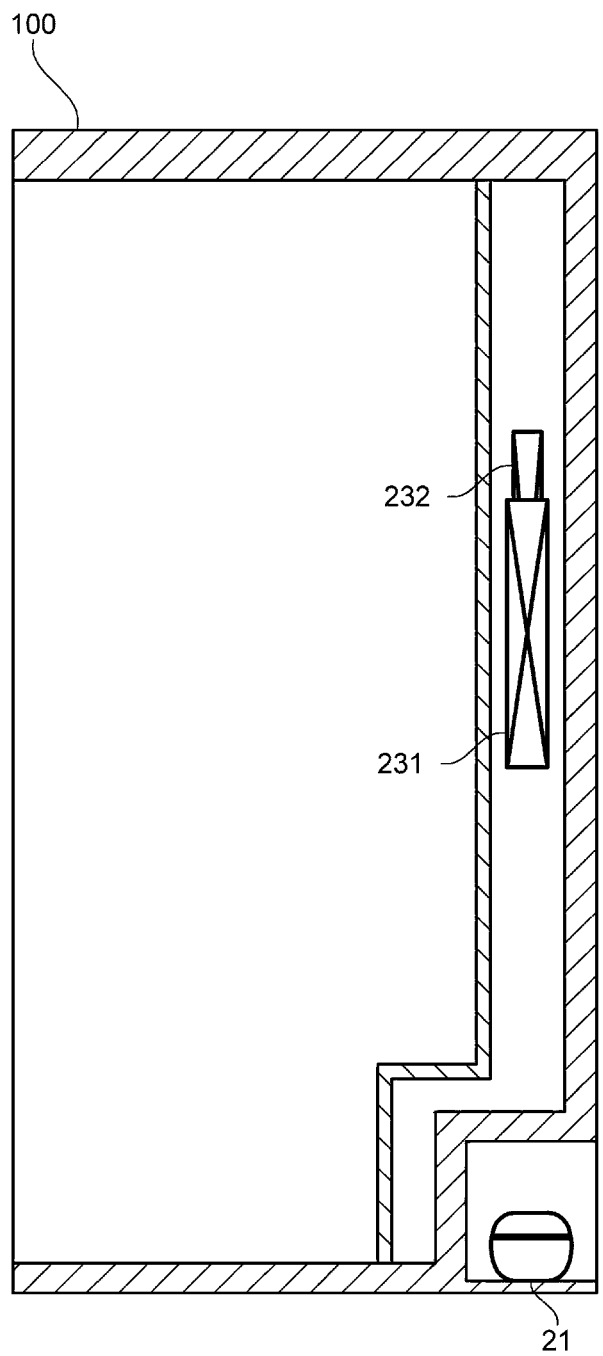
FIG. 12A is a schematic diagram of an inside of a refrigerator-freezer, according to a second embodiment.
Figure 12B:
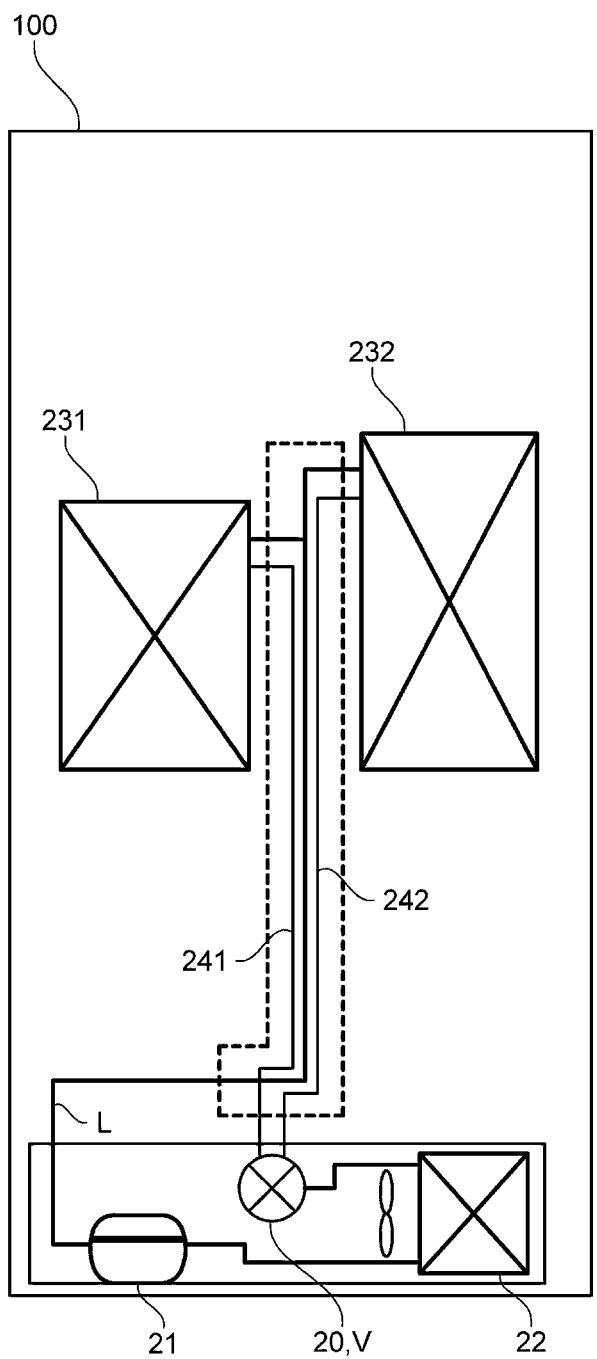
FIG. 12B is an arrangement plan of a refrigerant circuit of the refrigerator-freezer, according to the second embodiment.
Figure 13:
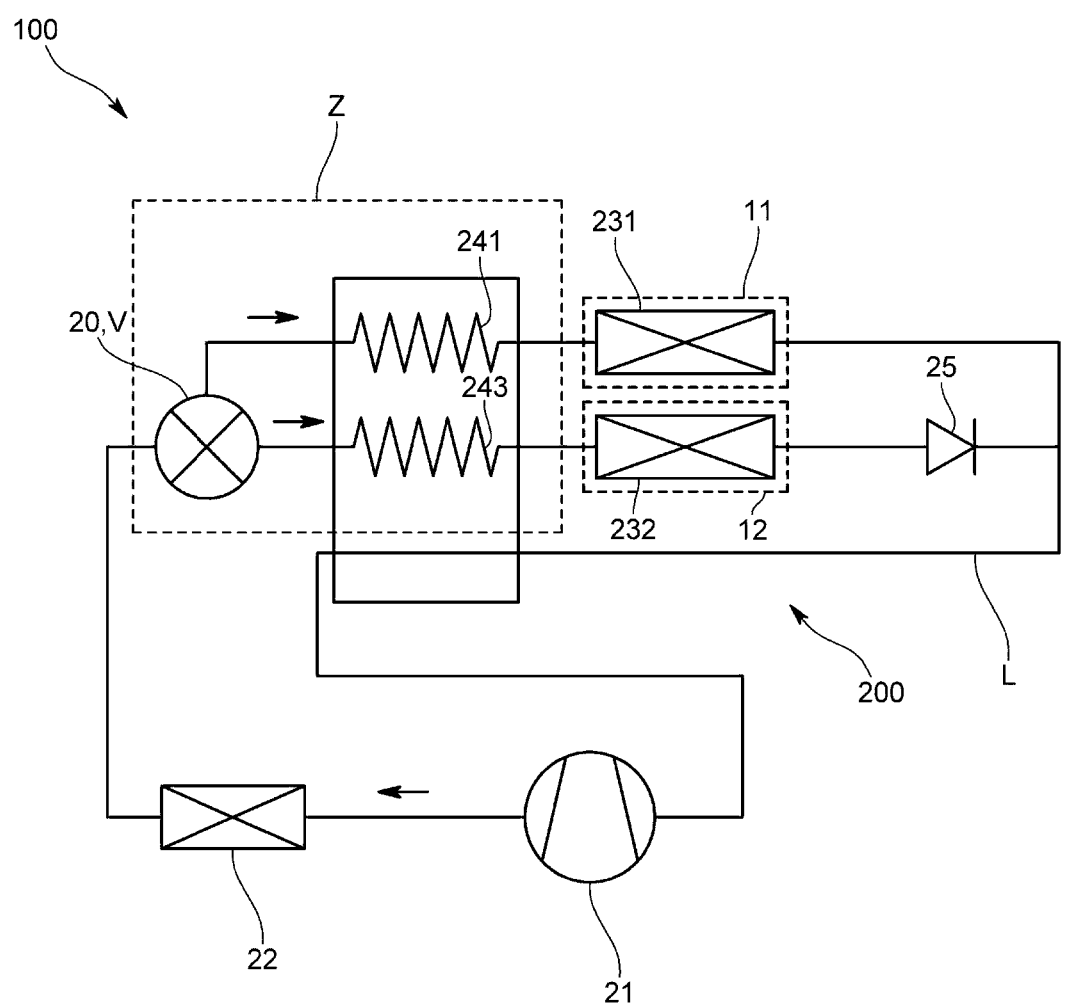
FIG. 13 is a schematic diagram illustrating the refrigerant circuit of the refrigerator-freezer, according to the second embodiment.

The valve structure 20 in this embodiment is used for e.g., a refrigerator-freezer 100, as shown in FIGS. 12A to 13. The refrigerator-freezer 100 in this embodiment is configured to be as same as in the first embodiment except that the refrigerator-freezer 100 in this embodiment is not equipped with an evaporator for flex zone and a decompressor for flex zone, so the detailed description thereof will not be repeated.

In this embodiment, the valve structure 20 is a so-called four-way valve to release a refrigerant to both or one of the evaporators for fridge or freezer 231 and 232, and is configured to be able to regulate the flow rate of the refrigerant to be released to each evaporator 231 or 232.

Figure 14:
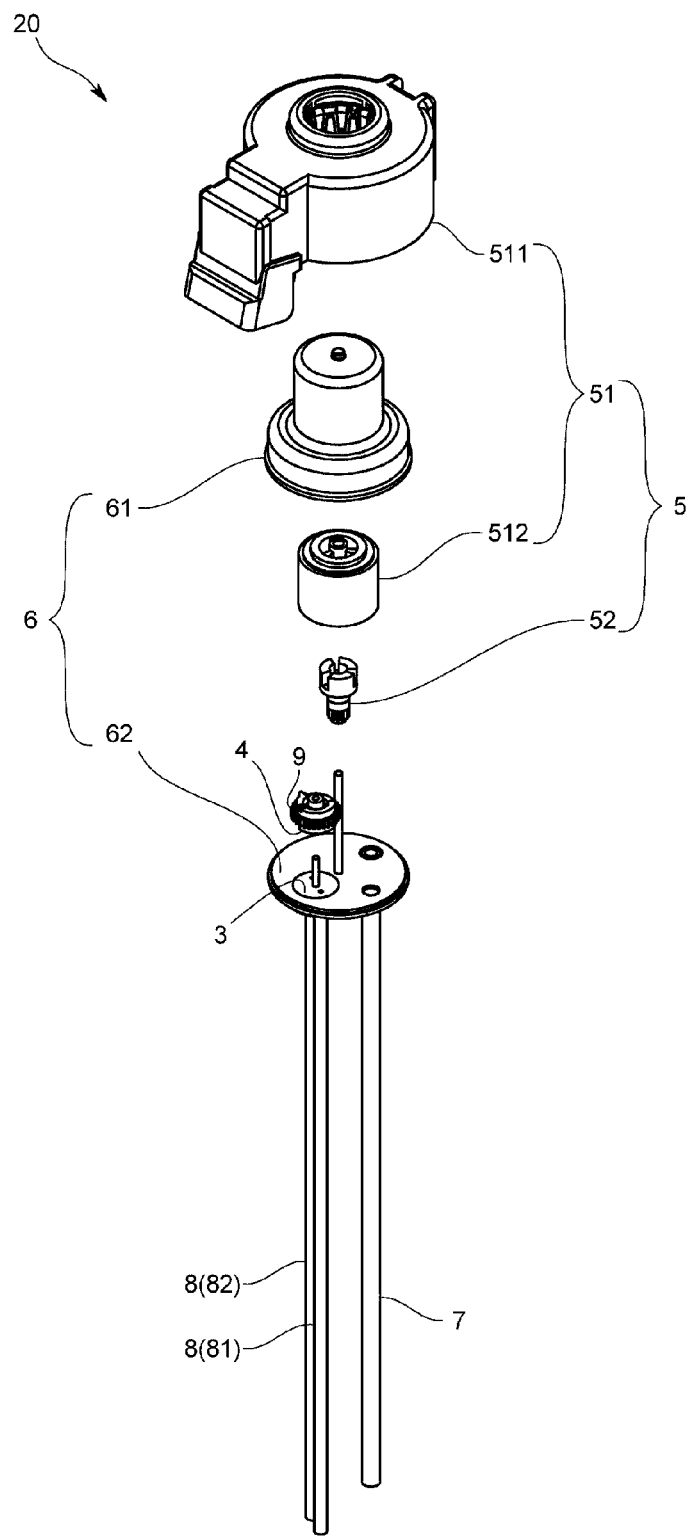
FIG. 14 is a schematic diagram of a whole valve structure viewed from above, according to the second embodiment.
Figure 15:
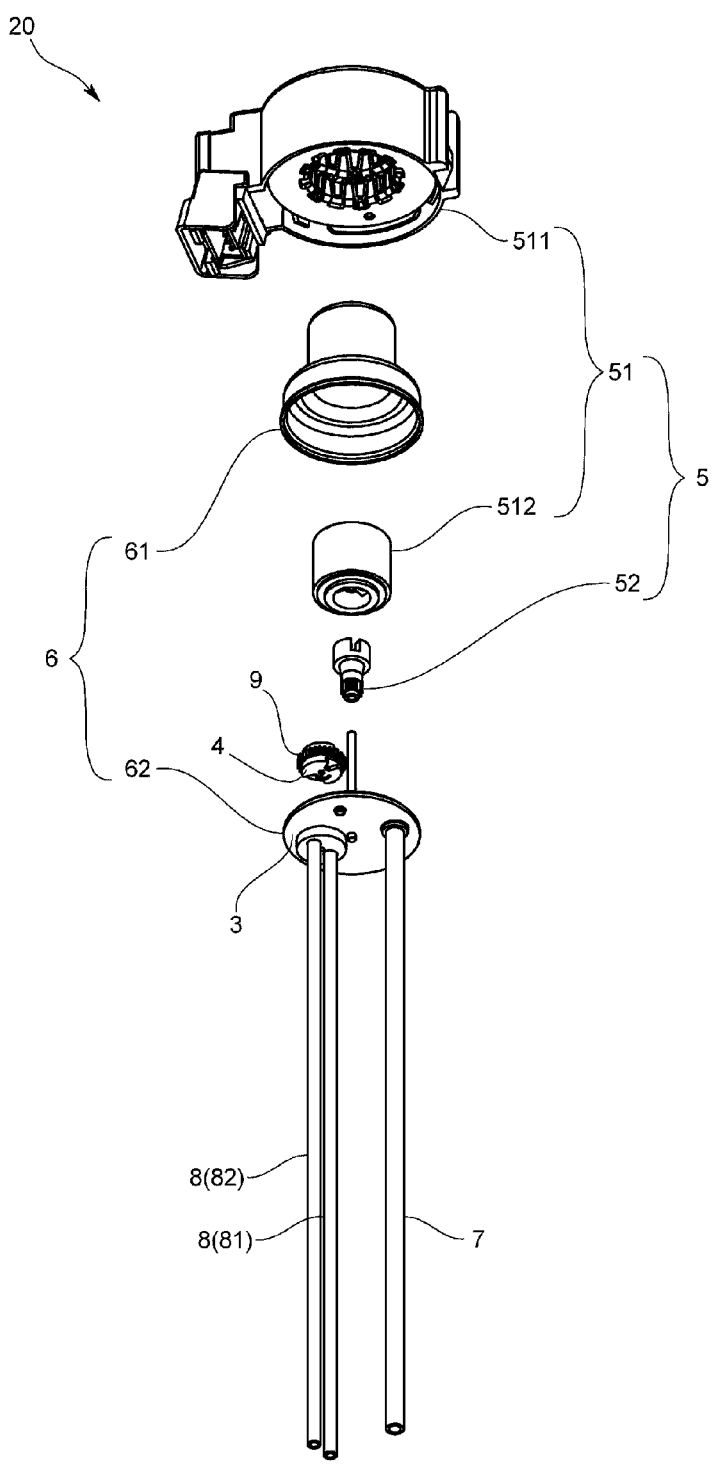
FIG. 15 is a schematic diagram of the whole valve structure viewed from below, according to the second embodiment.

Specifically, the valve structure 20 includes at least a valve sheet 3 and a valve body 4, as shown in FIGS. 14 and 15, and further includes a driving tool 5 for rotating the valve body 4 and a casing 6 that accommodates the valve sheet 3 and the valve body 4 and has a refrigerant inflow space into which the refrigerant flows.

The driving tool 5 and the casing 6 are the same as those in the first embodiment, so the description thereof will not be repeated.

The valve structure 20 in the first embodiment includes the two valve sheets 3 (the first valve sheet 3A and the second valve sheet 3B) and the two valve bodies 4 (the first valve body 4A and the second valve body 4B) arranged to correspond to the valve sheets 3, respectively, but the valve structure 20 in this embodiment includes a single valve sheet 3 and a single valve body 4.

Figure 16:
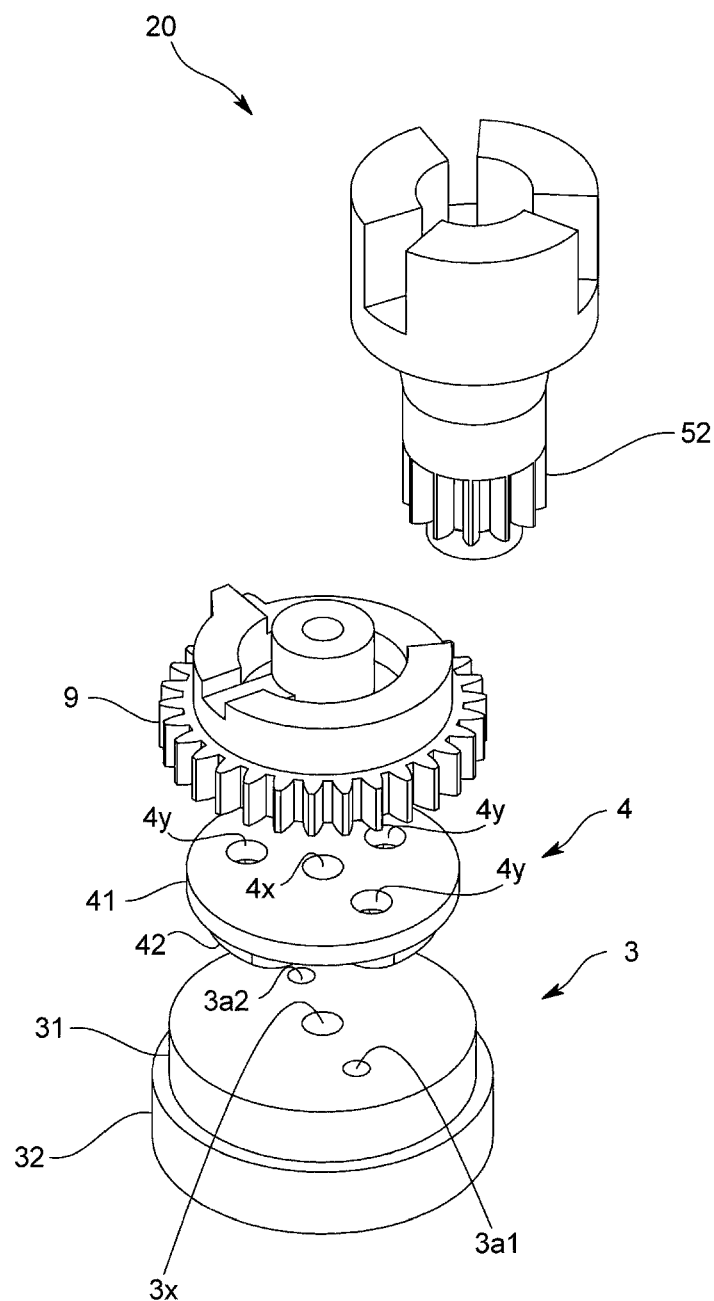
FIG. 16 is a schematic diagram of a valve sheet and a valve body viewed from above, according to the second embodiment.

In this embodiment, the valve sheet 3 is configured to be as same as the first valve sheet 3A in the first embodiment, and as shown in FIG. 16, has two outlets 3a (hereinafter, referred to as a first outlet 3a1 and a second outlet 3a2) formed thereon. In this embodiment, the first outlet 3a1 is connected to the entrance of the evaporator for fridge 231 by the first outlet pipe 81, and the second outlet 3a2 is connected to the entrance of the evaporator for freezer 232 by the second outlet pipe 82. The size of the valve sheet 3, the diameter of each outlet 3a1, 3a2, or the distance from the center of the valve sheet 3 to the center of each outlet 3a1, 3a2 is the same as in the first embodiment, but since the operation of the valve structure 20 differs from that of the first embodiment, arrangement of the outlets 3a1 and 3a2 differs from that of the first embodiment.

Figure 17:
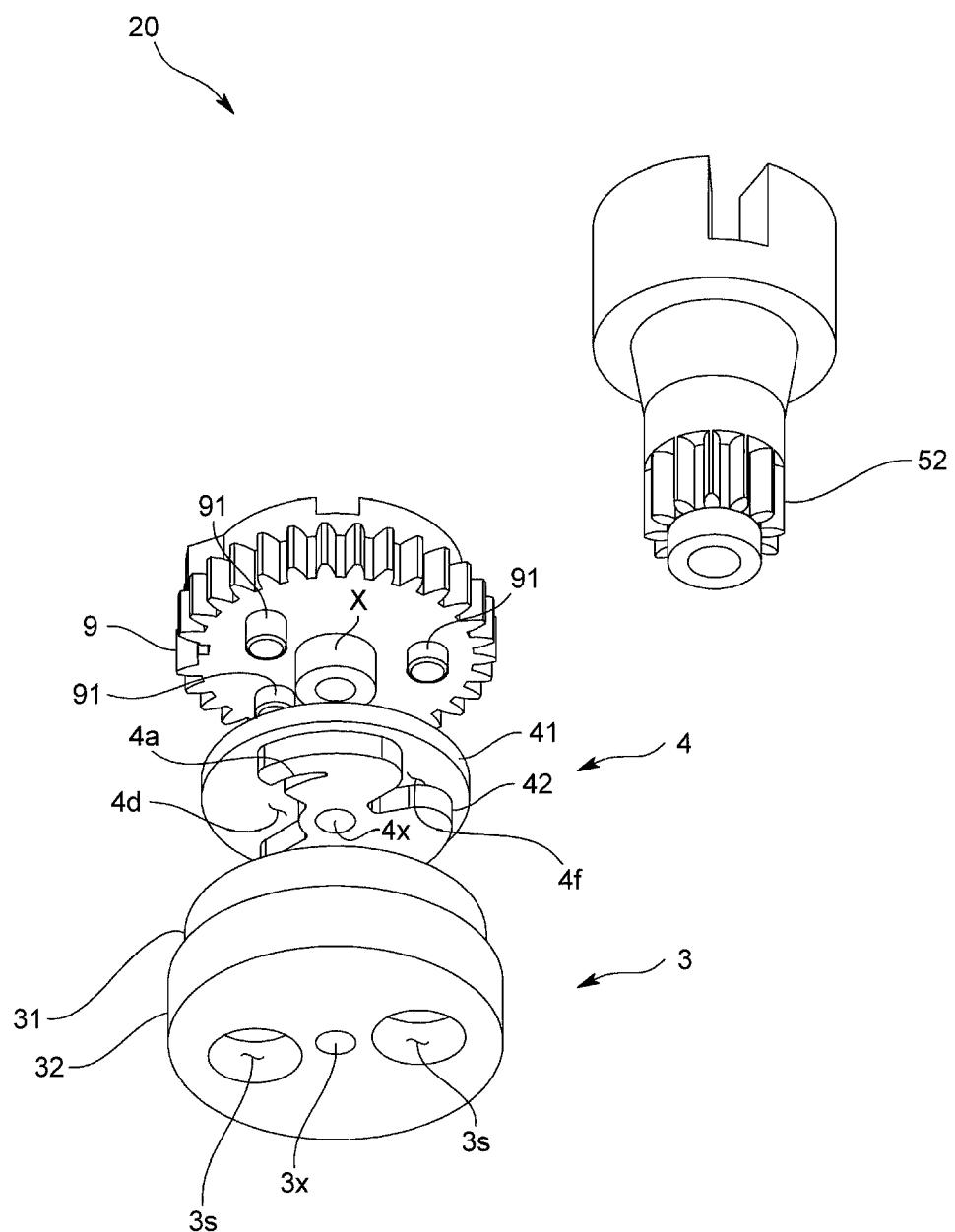
FIG. 17 is a schematic diagram of the valve sheet and the valve body viewed from below, according to the second embodiment.
Figure 18:
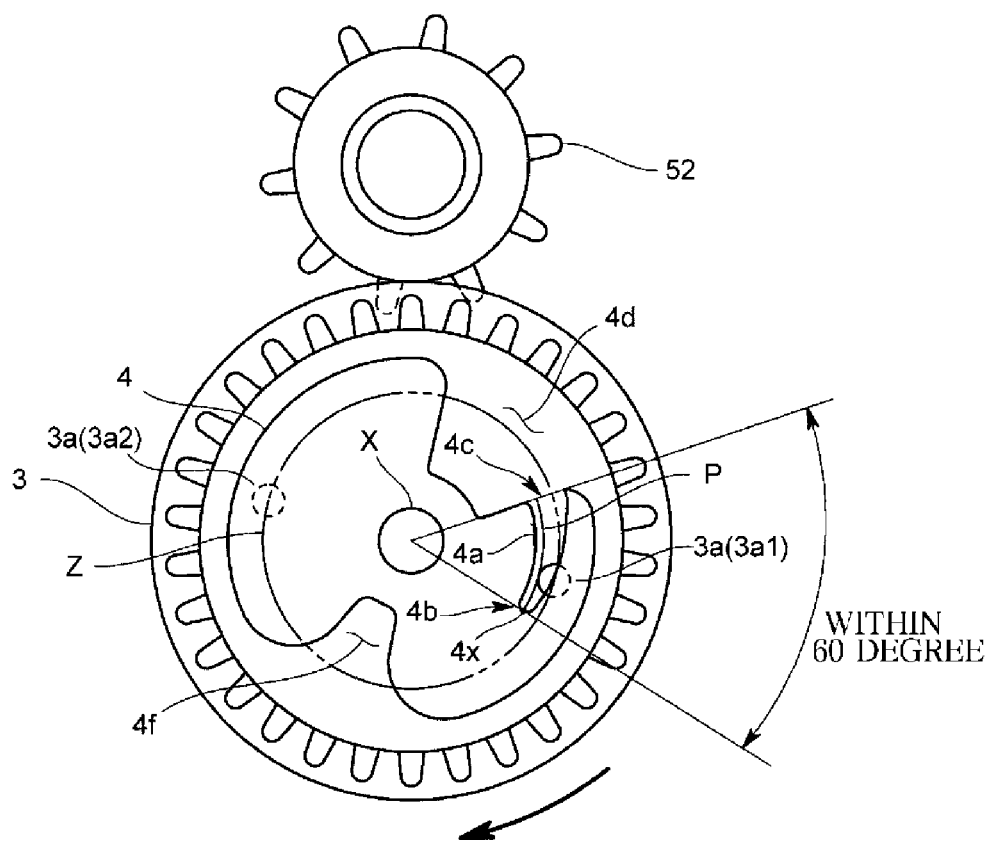
FIG. 18 is a plan view illustrating the valve sheet and the valve body, according to the second embodiment.

The valve body 4 has basically the same structure as the valve body 4 of the first embodiment. Specifically, the valve body 4 is provided to be rotational against the valve sheet 3, and intended to regulate the degree of opening of the outlet 3a between a fully open state and a fully closed state. As shown in FIGS. 17 and 18, the valve body 4 has a regulation recess 4a formed to have a changing area that overlaps the outlet 3a by rotation of the valve body 4, or the fully open recess 4d (hereinafter, also referred to as a first fully open recess 4d) formed to overlap the entire outlet 3a.

As in the first embodiment, the regulation recess 4a is formed to fall within 60 degrees around the rotation shaft X of the valve body 4 from the front end portion 4b to the rear end portion 4c.

In the meantime, the first fully open recess 4d is configured to form an angle wider than in the first embodiment in order to put both the two outlets 3a1 and 3a2 in the fully opened state using the single valve body 4.

As in the first embodiment, the center O of the outlet 3a is forced to deviate from the rotation trajectory of the front end portion 4b of the regulation recess 4a, or the width of a portion of the front end portion 4b overlapping the outlet 3a is set in consideration of the size of foreign materials that may flow into the front end portion 4b.

In this embodiment, as shown in FIGS. 17 and 18, the valve body 4 differs from the valve body of the first embodiment in that apart from the regulation recess 4a and the first fully open recess 4d, a second fully open recess 4f is formed at the valve body 4 to overlap with the entire outlet 3a.

The second full open recess 4f is formed by notching the lower part 42 of the valve body 4 in the circumferential direction, and is not continued from the first fully open recess 4d and the regulation recess 4a. The second fully open recess 4f is formed to overlap the entire outlet 3a1.

More specifically, the second fully open recess 4f is formed at a location overlapping with the whole of one of the outlets 3a while the first fully open recess 4d overlaps with the whole of the other outlet 3a.

The relative positional relation between the first and second fully open recesses 4d and 4f is designed based on the relative positional relation between the two outlets, and in this embodiment, the rotation shaft X of the valve body 4 is arranged between the first and second fully open recesses 4d and 4f.

Next, operation of the valve structure 20 and flows of the refrigerant in this embodiment will be described.

Figure 19:
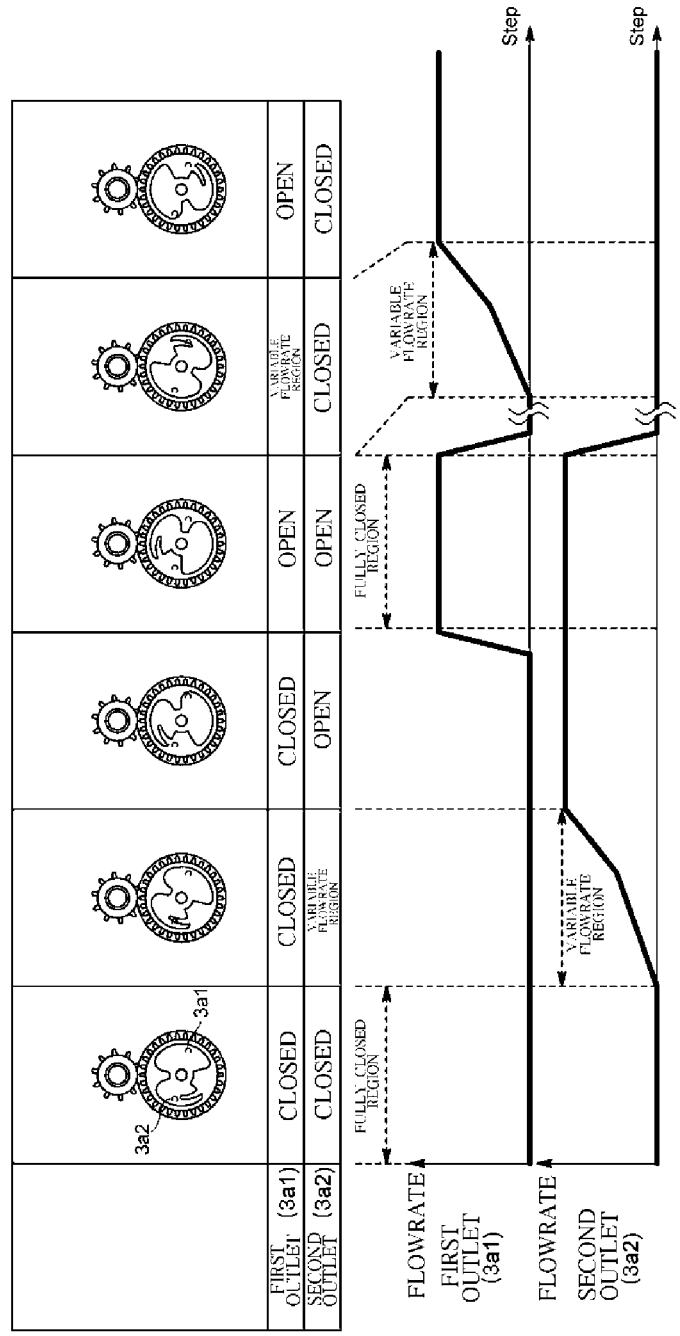
FIG. 19 is a diagram for explaining operation of the valve structure and flows of a refrigerant, according to the second embodiment.

In this embodiment, as shown in FIG. 19, the valve structure 20 is configured to form a fully closed region, a fully open region, and two variable flow rate regions according to the rotation angle of the valve body 4 as the valve body 4 is rotated.

In the fully closed region, the first and second outlets 3a1 and 3a2 are fully closed at the same time.

In the fully open region, the first and second outlets 3a1 and 3a2 are fully open at the same time, and in other words, one of the first and second fully open recesses 4d and 4f overlaps the whole of the first outlet 3a1 while the other of the first and second fully open recesses 4d and 4f overlaps the whole of the second outlet 3a2.

In the variable flow rate region, it is possible to regulate the flow rate of a refrigerant released from each of the outlets 3a1 and 3a2, separately, and in other words, the regulation recess 4a overlaps any one of the first and second outlets 3a1 and 3a2 while the other outlet is fully closed. The variable flow rate region is provided for each of the outlets 3a1 and 3a2.

Furthermore, in this embodiment, in the variable flow rate region, the flow rate of the refrigerant released from the first and second outlets 3a1 and 3a2 gradually increases.

Apart from the fully closed region, fully open region, and variable flow rate region, there is a region formed, as shown in FIG. 16, in which any one of the first and second outlets 3a1 and 3a2 is fully opened while the other outlet is fully closed. In other words, the region corresponds to a region where one of the first and second outlets 3a1 and 3a2 does not overlap the second fully open recess 4f while the other outlet overlaps the fully open recess 4d, which is obtained by a difference between angles in which the first and second fully open recesses 4d and 4f are formed.

In the refrigerator-freezer 100 configured as described above, the valve body 4 has the second fully open recess 4f apart from the first fully open recess 4d, and the second fully open recess 4f overlaps the whole of one outlet 3a when the first fully open recess 4d overlaps the whole of the other outlet 3a, so that not only the fully closed region and variable flow rate region but also the fully open region may be formed with a pair of the valve sheet 3 and valve body 4.

As a result, with the fully open region, the refrigerant may be released to both the evaporators for fridge and freezer 231 and 232, thereby improving cooling speed under an overload condition, e.g., at a time of pull-down.

Furthermore, with the fully closed region, inflow of a high-temperature refrigerant from the condenser 22 to each of the evaporators 231 and 232 may be prevented when the compressor 21 is stopped, thereby preventing a rise in temperature in each chamber 11 and 12 from the inflow of the refrigerant while the compressor 21 is stopped.

Moreover, with the variable flow rate region, the refrigerant may be regulated at a suitable flow rate according to a load condition while each of the chambers 11 and 12 is cooled.

Since the rotation trajectory of the front end portion 4b of the regulation recess 4a deviates from the center O of the outlet 3a, the front end portion 4b of the regulation recess 4a starts to overlap the outlet 3a from a direction angled from front of the outlet 3a.

This may reduce an overlapping area between the front end portion 4b of the regulation recess 4a and the outlet 3a as compared with the conventional occasion, making it possible to gradually increase the flow rate of the refrigerant, and thus to control with high precision the flow rate of a fluid when the fluid starts to be released.

By contrast, in the conventional occasion where the front end portion of the regulation recess passes the center of the outlet, it is not possible to regulate the flow rate with high precision, and the flow rate is hardly controlled because the precision is noticeably dropped when the flow rate is to be changed by the fully open recess without using the regulation recess.

Furthermore, the width of the overlapping area between the front end portion 4b of the regulation recess 4a and the outlet 3a is set for some foreign materials such as contaminants brought into the front end portion 4b to be released from the outlet 3a along with the refrigerant even after the foreign materials flows into the front end portion 4b of the regulation recess 4a.

Moreover, as in the first embodiment, with the expansion valve V and the capillary tubes 241 and 242 as the decompression tool Z, the liquid refrigerant condensed in the condenser 22 may be decompressed in phases in the expansion valve V and the capillary tubes 241 and 242.

The same advantages and effects may be obtained as in the first embodiment in that dew condensation may be prevented in a portion in the machine room of the capillary tubes 241 and 242 by keeping the temperature of the refrigerant released from the expansion valve V higher than evaporation temperature.

Moreover, as in the first embodiment, since the capillary tubes 241 and 242 and the refrigerant returning pipe L make thermal connection by e.g., soldering, returning of the liquid refrigerant may be prevented by heating the liquid refrigerant returning to the compressor from the evaporators 231 and 232 and cooling capacity may be improved by cooling the refrigerant flowing from the expansion valve V to the capillary tubes 241 and 242 toward the evaporators 231 and 232.

Furthermore, since the flow rate of the refrigerant is controlled by the fluid control recess formed in the valve body, the inlet pipe 7 or the plurality of outlet pipes 8 may have a variety of sizes of the pipe diameter. For example, the pipe diameters of the plurality of outlet pipes 8 may be the same or the inlet pipe 7 and the outlet pipe 8 may have the same size of pipe diameter.

The disclosure is not limited to the first and second embodiments.

For example, although in the first embodiment, the rotation trajectory of the fore-end of the regulation recess is forced to deviate from a virtual circle so that the fore-end of the regulation recess overlaps the outlet, the fore-end of the regulation recess may not overlap the outlet but some other portion of the front end portion than the fore-end may overlap the outlet.

Third Embodiment

Next, a third embodiment of the disclosure will be described with reference to drawings.

The valve structure 20 in accordance with the third embodiment is characterized by the location of the outlet 3a, which will now be described in detail.

First, the outlet 3a in the first or second embodiment is formed for the rotation trajectory P of the fore-end 4x of the regulation recess 4a to meet the outer side of the outlet 3a, as shown in FIG. 8.

Figure 20A:
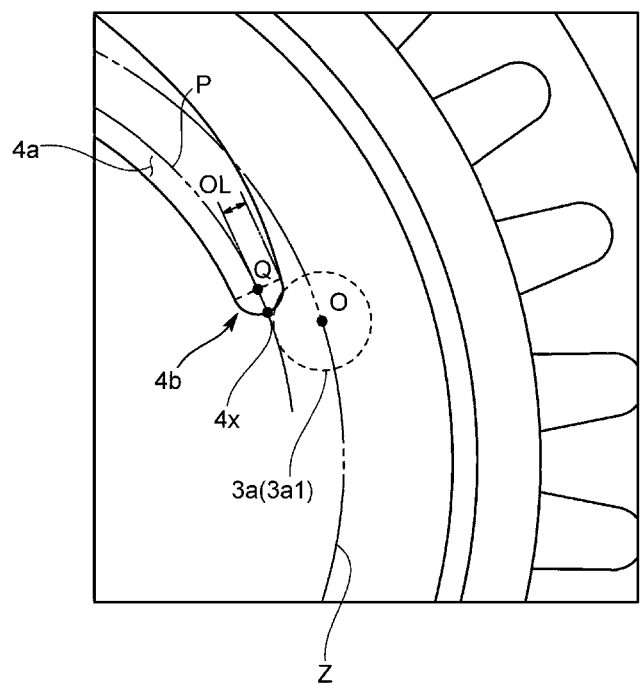
FIGS. 20A to 20C are schematic diagrams for explaining deviations of an outlet.
Figure 20B:
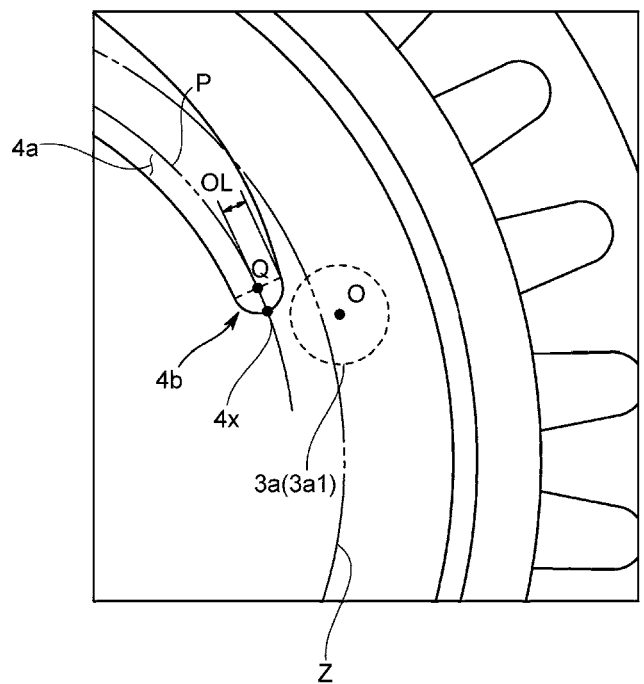
Figure 20C:
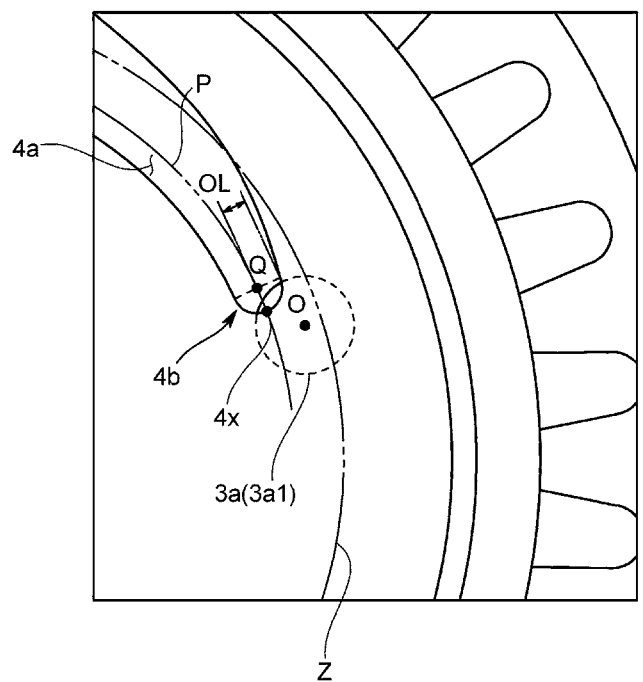

However, since there are manufacturing or assembling variations in the location of the outlet 3a, i.e., in the location of the center O of the outlet 3a, if the center O of the outlet 3a is a reference location in each of the aforementioned embodiments, as shown in FIG. 20A, the actual center O may deviate outward or inward in the radial direction (e.g., by 0.15 mm) from the reference location as shown in FIG. 20B or 20C.

Figure 21A:
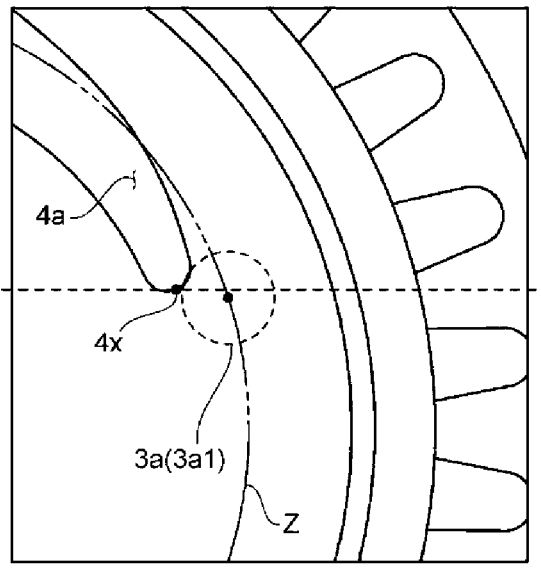
FIGS. 21A to 21C are schematic diagrams for explaining variations in degree of opening of a valve to be involved in deviations of an outlet.
Figure 21B:
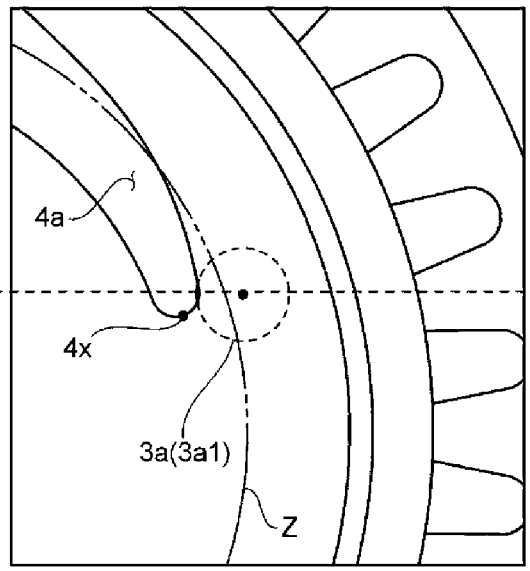
Figure 21C:
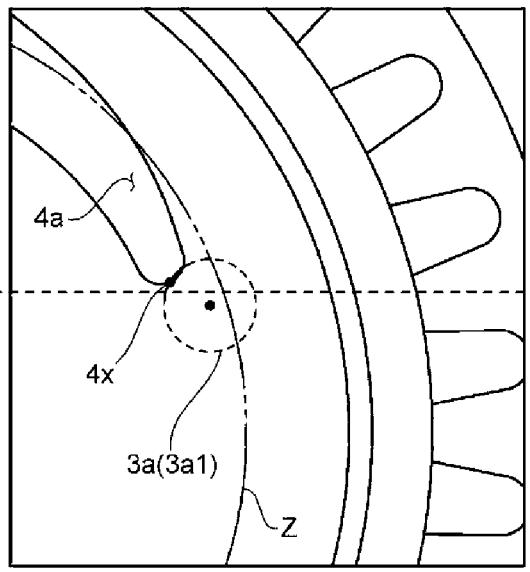

With this deviation, as shown in FIGS. 21A to 21C, there is a difference in the degree of valve opening (an angle at which the refrigerant starts to flow) of the valve body 4 when the regulation recess 4a and the outlet 3a overlap each other. Specifically, as shown in FIG. 21B, when the outlet 3a deviates outward in the radial direction, the degree of valve opening is small and the rotation angle at which the refrigerant starts to flow is reached late as compared with the occasion where the outlet 3a is at the reference location as shown in FIG. 21A, and when the outlet 3a deviates inward in the radial direction, the degree of valve opening is large and the rotation angle at which the refrigerant starts to flow is reached early as compared with the occasion where the outlet 3a is at the reference location.

Figure 22:
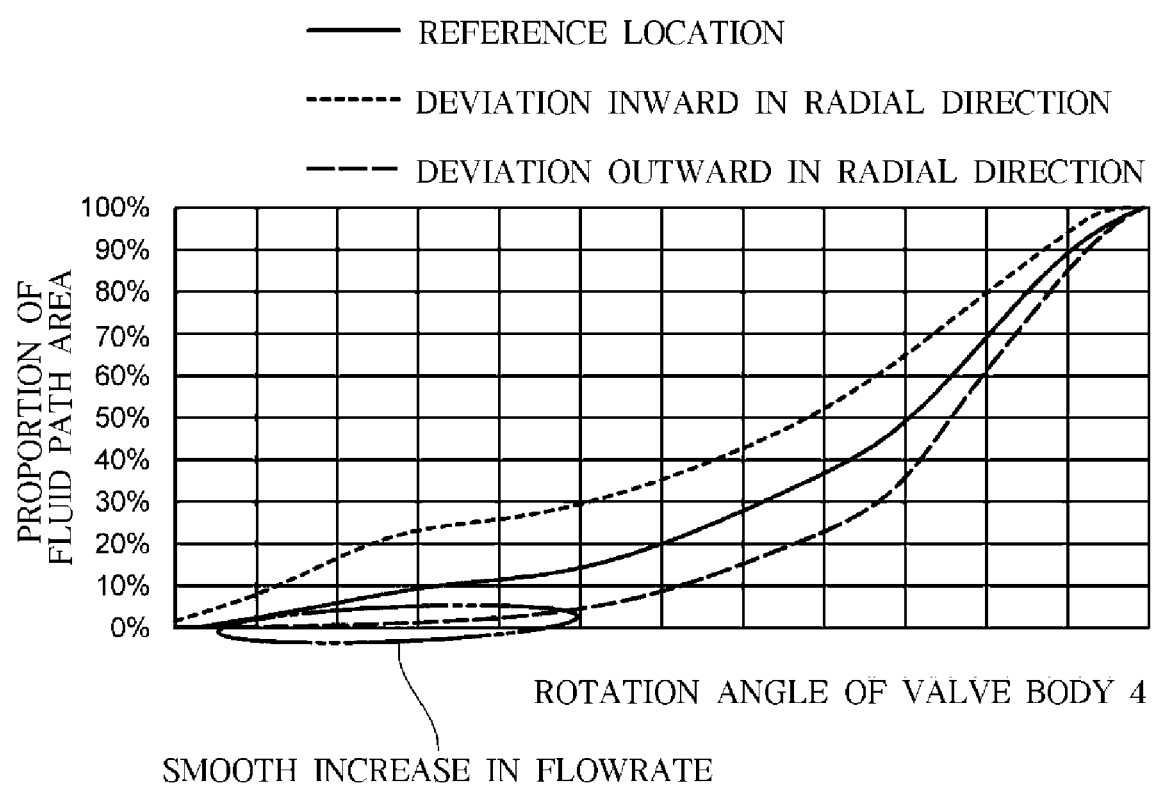
FIG. 22 shows changes in flow rate according to the first and second embodiments.

Furthermore, when the center O of the outlet 3a deviates outward in the radial direction from the reference location, the overlapping area between the front end portion 4b of the regulation recess 4a and the outlet 3a becomes so small in the first and second embodiments that the flow rate hardly increases as shown in FIG. 22 even by rotating the valve body 4 when the refrigerant starts to be released.

As a result, in this case that the outlet 3a deviates outward in the radial direction, the refrigerant does not flow at the same rotation angle as in the case that the outlet is at the reference location, which might cause a failure of cooling or if no failure of cooling, a damage to a basic performance, such as increase in power consumption.

Accordingly, in this embodiment, the valve structure 20 has the outlet 3a arranged on an inner side in the radial direction from the reference location as compared with the occasion in each of the embodiments. Specifically, the outlet 3a is arranged so that the rotation trajectory P of the fore-end 4x of the regulation recess 4a overlaps the outlet 3a at a point near the rotation shaft X of the valve body 4 rather than at the center O of the outlet 3a.

Figure 24:
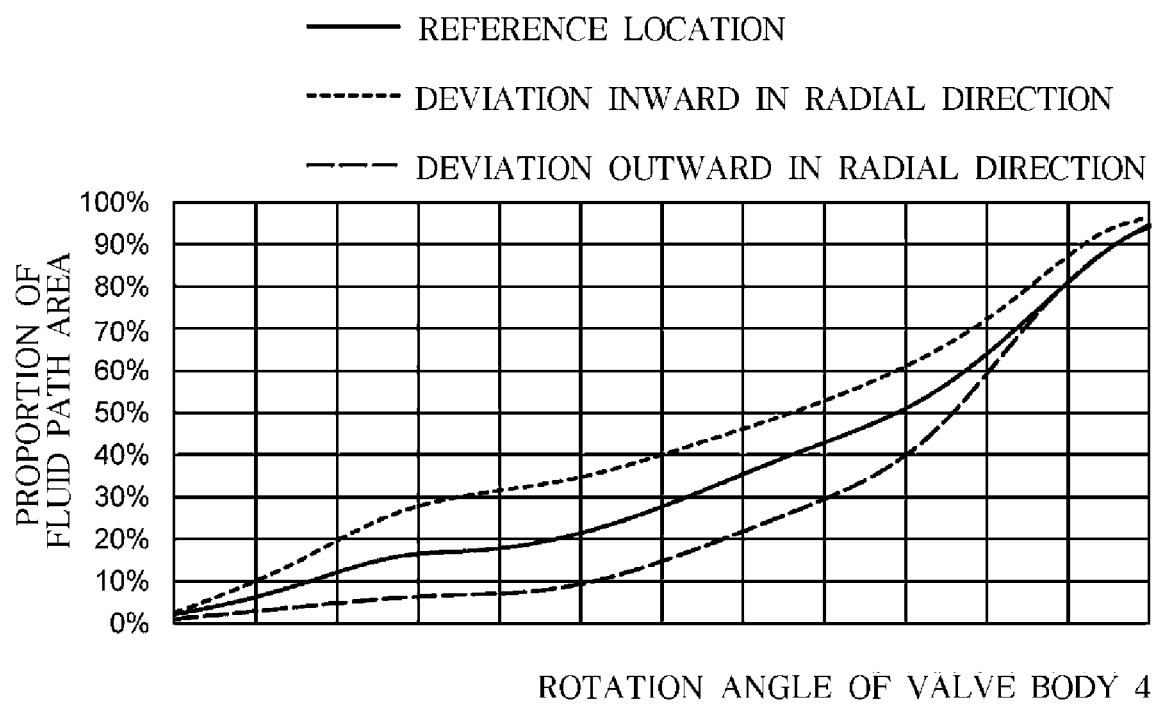
FIG. 24 shows changes in flow rate according to the third embodiment.

In such a manner in which the outlet 3a is arranged to be inward in the radial direction from the reference location as compared with the occasion in each of the aforementioned embodiments, even if the outlet 3a deviates outward in the radial direction as shown in FIG. 24, i.e., the overlapping area between the regulation recess 4a and the outlet 3a reaches a lower limit, the overlapping area between the front end portion 4b of the regulation recess 4a and the outlet 3a being too small when the refrigerant starts to be released may be prevented, thereby avoiding the aforementioned trouble of cooling failure or damage to basic performance such as increase in power consumption.

In the meantime, in this embodiment, when the outlet 3a deviates inward in the radial direction as shown in FIG. 21C due to the manufacturing or assembling variations, an overlapping area between the front end portion 4b of the regulation recess 4a and the outlet 3a as the valve body 4 is rotated after the front end portion 4b of the regulation recess 4a and the outlet 3a start to overlap becomes large as compared with the occasion in the first or second embodiment, leading to a sudden increase in flow rate, which makes it difficult to control the flow rate in a small flow rate region.

Figure 23:
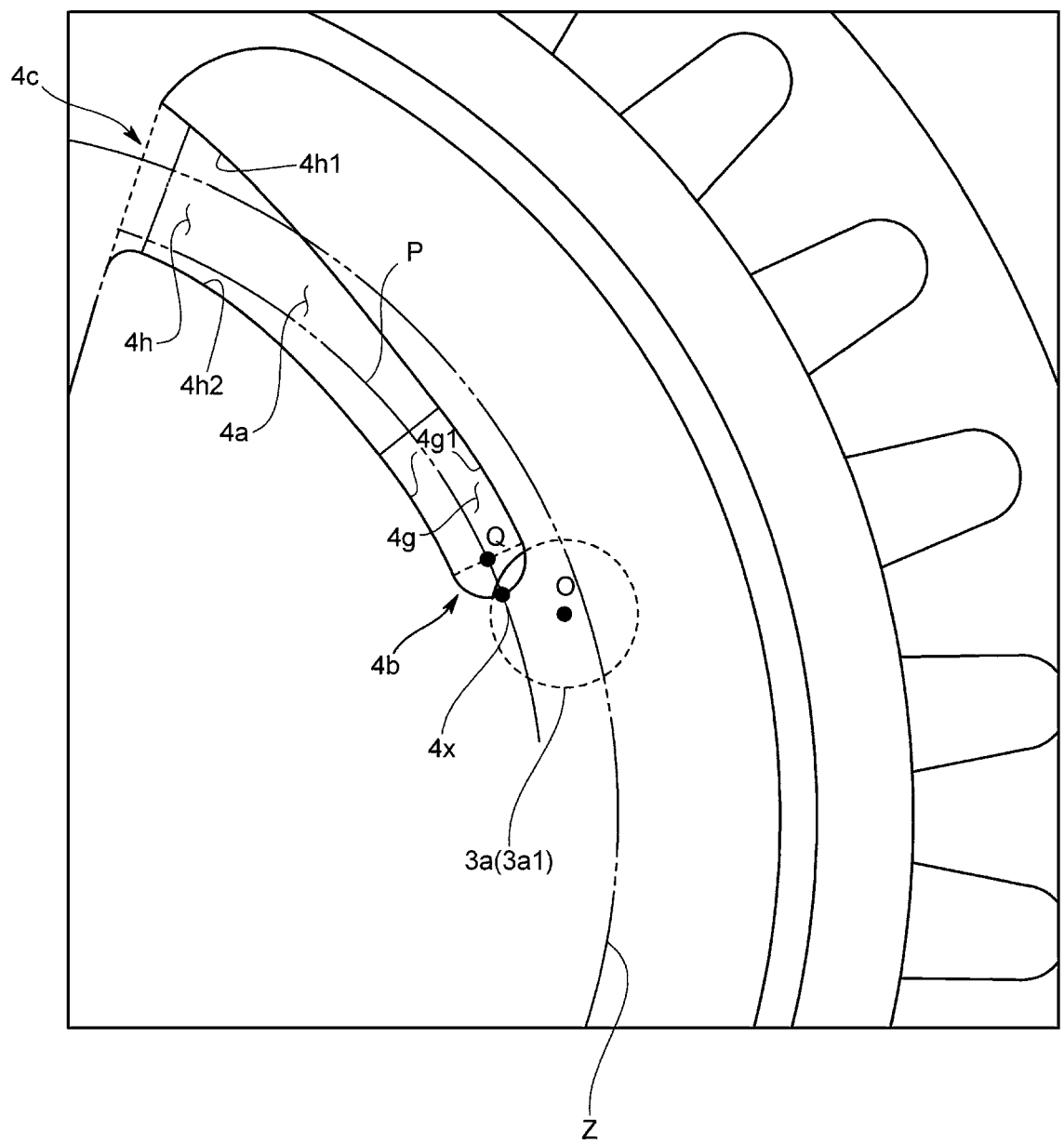
FIG. 23 is a schematic diagram for explaining an outlet and a regulation recess, according to a third embodiment.

Taking this into account, the regulation recess 4a in this embodiment has a different form from that in the first or second embodiment. Specifically, as shown in FIG. 23, the regulation recess 4a has a narrow portion 4g formed toward the rear end portion 4c from the front end portion 4b and an expansion portion 4h formed toward the rear end portion 4c from the narrow portion 4g, as shown in FIG. 23.

The form of the regulation recess 4a being asymmetrical to the rotation trajectory P of the fore-end 4x or the front end portion 4b shaped like a partial circle are the same as in the first or second embodiment.

The narrow portion 4g has the form with smaller width than the expanding portion 4h, and in this case, it is formed to have constant width rather than changing width in the circumferential direction. Specifically, the narrow portion 4g has a pair of opposite sides 4g1, which are parallel to each other, and the width between the sides 4g1 has the same size as the diameter of the front end portion 4b forming the shape of a partial circle (e.g., minimum size for manufacturing). The sides 4g1 extends in the tangential direction from both ends of the front end portion 4b, and is parallel to the rotation trajectory P of the fore-end 4x.

The expanding portion 4h is formed to have changing width in the circumferential direction, and particularly, to have growing width toward the rear end portion 4c, i.e., have a shape spreading toward the rear end portion 4c from the narrow portion 4g.

More specifically, the outer side 4h1 of the expanding portion 4h is formed to get away from the rotation trajectory P of the fore-end 4x to the outside, and the inner side 4h2 of the expanding portion 4h is formed to get close to the rotation trajectory P of the fore-end 4x. Accordingly, the outer side 4h1 and inner side 4h2 of the expanding portion 4h are asymmetrical to the rotation trajectory P of the fore-end 4x. Furthermore, the inner side 4h2 may be parallel to the rotation trajectory P of the fore-end 4x.

In this manner in which the narrow portion 4g formed from the front end portion 4b toward the rear end portion 4c has the constant width in the circumferential direction, even when the outlet 3a deviates inward in the radial direction, growth of the overlapping area between the front end portion 4b of the regulation recess 4a and the outlet 3a as the valve body 4 is further rotated after the front end portion 4b of the regulation recess 4a and the outlet 3a starts to overlap each other may be suppressed.

This structure may prevent a sudden increase in flow rate when the refrigerant starts to be released even when the overlapping area between the regulation recess 4a and the outlet 3a reaches an upper limit, thereby making it possible to control the flow rate in a minimum flow rate region with the minimum influence of the manufacturing or assembling variations of the regulation recess 4a or outlet 3a.

Furthermore, since the narrow portion 4g is formed to be parallel with the rotation trajectory P of the fore-end 4x, a sudden increase in the flow rate may be prevented when the refrigerant starts to be released even when the overlapping area between the regulation recess 4a and the outlet 3a reaches an upper limit (the maximum).

Moreover, since the outer side 4h1 of the expanding portion 4h is formed to get away from the rotation trajectory P of the fore-end 4x to the outside, the flow rate of the refrigerant may gradually increase after the refrigerant starts to be released to some extent, thereby preventing a sudden increase in the flow rate when the entire regulation recess 4a continues to pass by the outlet 3a and the outlet 3a becomes fully opened.

In addition, since the inner side of the expanding portion is formed to get close to the rotation trajectory of the front end portion, the flow rate may gradually increase by preventing a sudden increase in the flow rate after the refrigerant starts to be released to some extent, thereby reducing variations in portion of the flow path area that occur in the narrow portion.

As described above, with the valve structure 20 in accordance with this embodiment, as shown in FIG. 24, even when the outlet 3a deviates outward in the radial direction, a flow rate of the refrigerant may be secured when the refrigerant starts to be released and simultaneously, a sudden growth in the flow rate may be prevented when the refrigerant starts to be released.

Although in the third embodiment, the outlet 3a is arranged to be inward in the radial direction from the reference location as compared with an occasion in the first or second embodiment, the same effects may be obtained even if the regulation recess 4a is arranged to be outward in the radial direction from the reference direction as compared with the occasion in the first or second embodiment.

While the present disclosure has been particularly described with reference to exemplary embodiments, it should be understood by those of skilled in the art that various changes in form and details may be made without departing from the spirit and scope of the present disclosure.

The invention claimed is:

1. A refrigerator comprising:
a compressor;
a condenser;
a first evaporator; and
a valve configured to send a refrigerant released from the condenser to the first evaporator,
wherein the valve comprises:
a first valve sheet having a first outlet through which the refrigerant in the valve is released, and
a first valve body movable against the first outlet to regulate a degree of opening of the first outlet,
wherein the first valve body comprises a first regulation recess configured to regulate the degree of opening of the first outlet,
wherein a center of the first outlet is located outward from a movement trajectory of a center of an end portion of the first regulation recess,
wherein an inner surface and an outer surface of a narrow portion of the first regulation recess are parallel to the movement trajectory, and
wherein an outer surface of an expanding portion of the first regulation recess expands from the movement trajectory and an inner surface of the expanding portion of the first regulation recess is formed to get closer to the movement trajectory toward a rear end portion of the first regulation recess.

2. The refrigerator of claim 1, wherein:
the first valve body is arranged to be rotational against the first valve sheet,
the first outlet is linkable to the first evaporator when the first regulation recess is placed to overlap the first outlet by rotation of the first valve body, and
an overlapping area of the first regulation recess non-linearly increases when the first regulation recess is rotated along the movement trajectory and starts to overlap the first outlet.

3. The refrigerator of claim 2, wherein the first regulation recess is opened in an opening direction of the first outlet, and extends in a circumferential direction of a rotation shaft of the first valve body, and comprises an opening arranged to be opened from the end portion in an opposite direction of a rotation direction of the first valve body.

4. The refrigerator of claim 2, wherein the center of the first outlet is located outward in a radial direction from a rotation shaft of the first valve body from the movement trajectory of the center of the end portion of the first regulation recess.

5. The refrigerator of claim 2, wherein the first regulation recess is placed in a region of 60 degrees or less in a radial direction around a rotation shaft of the first valve body.

6. The refrigerator of claim 2, further comprising a second evaporator,
wherein the valve is configured to send a refrigerant released from the condenser to the first evaporator and the second evaporator, and further comprises a second valve sheet having a second outlet through which the refrigerant is released to the second evaporator and a second valve body arranged to be rotational against the second valve sheet and having a second regulation recess regulating a degree of opening of the second outlet, and
wherein the second outlet is linkable to the second evaporator when the second regulation recess is placed to overlap the second outlet by rotation of the second valve body, and a center of the second outlet is located outward from a movement trajectory of a center of an end portion of the second regulation recess.

7. The refrigerator of claim 6, wherein:
the valve further comprises a motor and a driving gear coupled with a rotation shaft of the motor, and
the first valve body and the second valve body are each engaged with the driving gear and rotated in association with rotation of the driving gear.

8. The refrigerator of claim 7, wherein:
the first valve body and the second valve body are arranged to open the first outlet and the second outlet, respectively, when the driving gear is rotated at a first rotation angle,
the first valve body is arranged for the first outlet to overlap the first regulation recess and to close the second outlet, when the driving gear is rotated at a second rotation angle,
the first valve body and the second valve body are arranged to close the first outlet and the second outlet, respectively, when the driving gear is rotated at a third rotation angle, and
the first valve body is arranged to close the first outlet and the second valve body is arranged for the second regulation recess of the second valve body to overlap the second outlet, when the driving gear is rotated at a fourth rotation angle.

9. The refrigerator of claim 2, further comprising a second evaporator,
wherein:
the valve sends a refrigerant released from the condenser to the first evaporator and the second evaporator,
the first valve sheet further comprises a second outlet through which a refrigerant is released to the second evaporator,
the first regulation recess regulates a degree of opening of the second outlet,
the first outlet and the second outlet are opened when the first valve body is rotated at a first rotation angle,
one of the first outlet and the second outlet is placed to overlap the first regulation recess while the other is closed when the first valve body is rotated at a second rotation angle, and the first outlet and the second outlet are closed when the first valve body is rotated at a third rotation angle.

* * * * *